US011510282B2

(12) United States Patent
Seki et al.

(10) Patent No.: US 11,510,282 B2
(45) Date of Patent: Nov. 22, 2022

(54) MASTER STATION DEVICE, BASE STATION, AND COMMUNICATION CONTROL METHOD

(71) Applicant: Panasonic Corporation, Osaka (JP)

(72) Inventors: Yuta Seki, Kanagawa (JP); Ryuji Muta, Kanagawa (JP)

(73) Assignee: Panasonic Holdings Corporation, Osaka (JP)

(*) Notice: Subject to any disclaimer, the term of this patent is extended or adjusted under 35 U.S.C. 154(b) by 0 days.

(21) Appl. No.: 17/183,040

(22) Filed: Feb. 23, 2021

(65) Prior Publication Data
US 2021/0289585 A1 Sep. 16, 2021

(30) Foreign Application Priority Data

Mar. 11, 2020 (JP) .............................. JP2020-042059

(51) Int. Cl.
H04W 88/08 (2009.01)
H04L 5/00 (2006.01)
H04W 28/02 (2009.01)
H04W 28/08 (2009.01)

(52) U.S. Cl.
CPC ......... *H04W 88/085* (2013.01); *H04L 5/0005* (2013.01); *H04W 28/0289* (2013.01); *H04W 28/0967* (2020.05)

(58) Field of Classification Search
CPC ........... H04W 88/085; H04W 28/0289; H04W 28/0967; H04W 72/085; H04L 5/0005; H04L 5/003; H04L 5/0057; H04L 47/824; H04L 47/762
See application file for complete search history.

(56) References Cited

U.S. PATENT DOCUMENTS

2014/0334417 A1    11/2014  Aminaka et al.
2018/0234991 A1*   8/2018   Becvar ................. H04W 72/04
2019/0007954 A1*   1/2019   Mach ................... H04W 72/04

FOREIGN PATENT DOCUMENTS

FR    3062769 A1 *  8/2018  ............ H04W 28/16
JP    2016-111637 A   6/2016
JP    2018-170805 A  11/2018

OTHER PUBLICATIONS

3GPP TS 38.300 V15.4.0, "3rd Generation Partnership Project; Technical Specification Group Radio Access Network; NR; NR and NG-RAN Overall Description; Stage 2 (Release 15)," Dec. 2018, 97 pages.
CPRI Specification V7.0, "Common Public Radio Interface (CPRI); Interface Specification," Oct. 9, 2015, 128 pages.
ECPRI Specification V2.0, "Common Public Radio Interface: eCPRI Interface Specification," May 10, 2019, 109 pages.
ITU-T, "Series G: Transmission Systems and Media, Digital Systems and Networks; 5G wireless fronthaul requirements in a passive optical network context," Telecommunication Standardization Sector of ITU, ITU-T G-series Recommendations—Supplement 66, Oct. 2018, 42 pages.

* cited by examiner

Primary Examiner — Mohamed A Kamara
(74) Attorney, Agent, or Firm — Seed IP Law Group LLP

(57) ABSTRACT

A base station determines, based on transmission quality information of a fronthaul and channel quality information of a terminal, a resource and a transmission scheme of the fronthaul assigned to the terminal, and controls, based on determined information, the transmission scheme of a signal to be transmitted to the fronthaul using the determined resource.

12 Claims, 17 Drawing Sheets

MASTER STATION DEVICE, BASE STATION, AND COMMUNICATION CONTROL METHOD

BACKGROUND

1. Technical Field

The present disclosure relates to a master station device, a base station, and a communication control method.

2. Background Art

In a radio communication system, in order to flexibly arrange an area where radio communication with a user terminal (user equipment, UE) is possible, it is possible to split a radio base station into a master station device and a secondary station device, and adopt a configuration in which the secondary station device is placed at a different position from the master station device.

For example, the master station device connected to a core network has a baseband signal processing function of the radio base station, and one or more secondary station devices are connected to the master station device. The secondary station device performs radio processing such as analog conversion and performs radio communication with the UE.

SUMMARY

However, in an existing radio communication system (for example, a radio base station), there is room for consideration regarding transmission efficiency between the master station device and the secondary station device (fronthaul (FH)).

Non-limiting examples of the present disclosure contribute to providing the master station device, a base station, and a communication control method capable of improving the transmission efficiency of the fronthaul.

The master station device according to one aspect of the present disclosure includes a controller that determines, based on transmission quality information of a fronthaul and channel quality information of a terminal, a resource and a transmission scheme of the fronthaul assigned to the terminal, and a transmitter that controls, based on information determined by the controller, the transmission scheme of a signal to be transmitted to the fronthaul by the resource.

These general and specific aspects may be implemented with a system, an apparatus, a method, an integrated circuit, a computer program, and a recording medium, and may be implemented also with a desired combination of them.

According to one aspect of the present disclosure, transmission efficiency of the fronthaul can be improved.

Additional benefits and advantages of one aspect of the present disclosure will become apparent from the specification and drawings. The benefits and/or advantages may be individually obtained by the various exemplary embodiments and features of the specification and drawings, which need not all be provided in order to obtain one or more of such benefits and/or advantages.

DETAILED DESCRIPTION OF PREFERRED EMBODIMENTS

Figure 1:
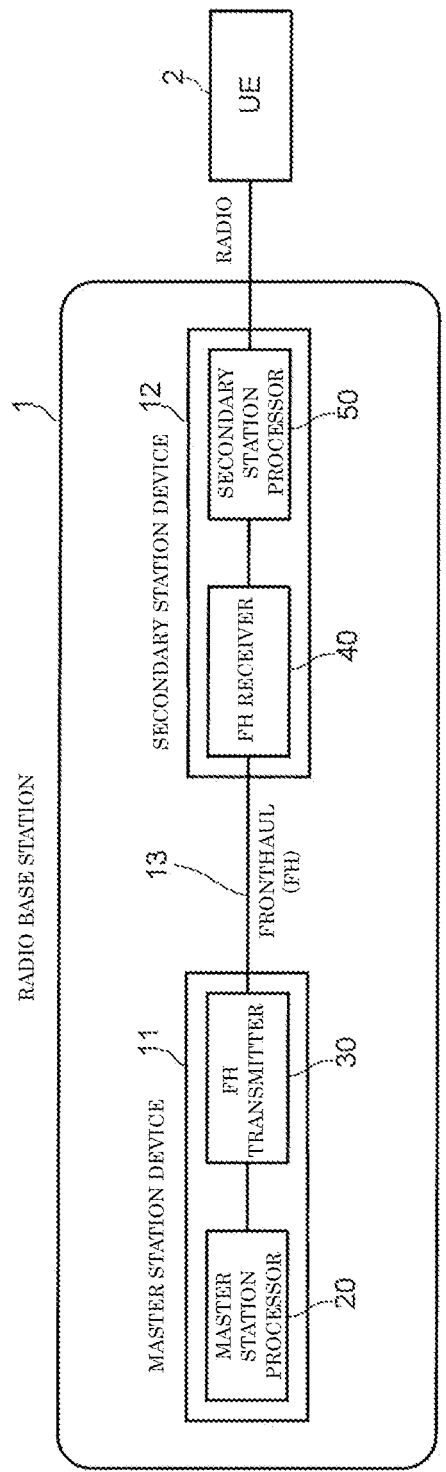
FIG. 1 is a diagram showing an example of a configuration of a radio communication system according to a first exemplary embodiment.

Hereinafter, exemplary embodiments will be described with reference to the drawings as appropriate. It is noted that a more detailed description than need may be omitted. For example, the detailed description of already well-known matters and the overlap description of substantially same configurations may be omitted. This is to avoid an unnecessarily redundant description and to facilitate understanding of a person skilled in the art.

Note that the attached drawings and the following description are provided for those skilled in the art to fully understand the present disclosure, and are not intended to limit the subject matter as described in the appended claims.

Underlying Knowledge Forming Basis of the
Present Disclosure

In the existing technology (for example, Unexamined Japanese Patent Publication No. 2018-170805), a master station device may be referred to as BBU (baseband unit), and a secondary station device may be referred to as RRH (remote radio head). For a connection between the master station device and the secondary station device, for example, wired transmitting means (or a wired interface) such as a coaxial cable, a UTP (unshielded twisted pair) cable, an STP (Shielded twisted pair) cable, or an optical fiber cable is used. Such a connection between the master station device and the secondary station device may be referred to as a "fronthaul connection" or simply a "fronthaul".

In a specification regarding a communication method of the fronthaul (FH) (for example, Common Public Radio Interface (CPRI) Interface Specification V7.0 (2015 Oct. 9)), the master station device is referred to as REC (radio equipment controller), and the secondary station device is referred to as RE (radio equipment).

As radio communication becomes faster and its capacity becomes larger, an amount of FH communication (for example, an amount of data traffic) also increases. Consequently, a communication band of FH may become tight.

As an example of countermeasures against FH band tightness, it is considered to reduce a traffic amount of FH by changing a configuration for splitting (or separating) a plurality of base station functions into the master station device and the secondary station device from a conventional configuration (for example, Unexamined Japanese Patent Publication No. 2018-170805). A boundary at which a plurality of base station functions are split among the master station device and the secondary station device may be referred to as a "functional split point". A "functional split configuration" may be referred to as a "functional split architecture".

Also in the Common Public Radio Interface: eCPRI Interface Specification V2.0 (2019 May 10), it is considered to change the functional split between the master station device and the secondary station device.

In addition, a method of changing user assignment and resource assignment of radio communication according to the availability of the FH band is also considered (for example, Unexamined Japanese Patent Publication No. 2016-111637). For example, by preparing some patterns related to user assignment and resource assignment of radio communication and applying a pattern that fits in the FH band, it is possible to avoid the FH band tightness.

However, even if the functional split between the master station device and the secondary station device is changed as described in the Common Public Radio Interface (CPRI) Interface Specification V7.0 (2015 Oct. 9), when the entire traffic amount increases, the FH band tightness may occur. Applying the pattern that fits in the FH band as in Unexamined Japanese Patent Publication No. 2016-111637 imposes a limit on the FH band. Thus, although it is possible to suppress transmission of an amount of data exceeding the FH band to the FH, it does not lead to an increase in an amount of transmission traffic of the FH.

On the other hand, there is considered a method of allowing residual distortion (hereinafter sometimes referred to as "residual signal distortion") of a signal transmitted in FH transmission to reduce redundancy (for example, a code amount used for error detection such as a parity bit) of the FH transmission.

For example, the residual signal distortion in the FH transmission is compensated by MCS (modulation and coding scheme) control in a radio section. With such compensation control, for example, a terminal to which a lower MCS is applied can have higher resistance (or robustness) to residual signal distortion in the FH transmission. Hereinafter, the resistance to the residual signal distortion in the FH transmission is sometimes abbreviated as "FH residual distortion resistance".

By the way, the base station can transmit a data signal by simultaneously multiplexing a plurality of different terminals (in other words, a user). For example, the base station multiplexes a plurality of terminals by assigning different RBs to a plurality of terminals that communicate with each other in a unit called a resource block (RB).

Here, there will be considered the case where a terminal to which a high MCS is applied (hereinafter sometimes abbreviated as a "high MCS terminal") and a terminal to which a low MCS is applied (hereinafter sometimes abbreviated as a "low MCS terminal") are multiplexed.

For example, when an FH transmission quality is designed in accordance with a high MCS terminal, the FH residual distortion resistance of a low MCS terminal is higher than that of the high MCS terminal, so that excessive redundancy may be given in the FH transmission.

Conversely, when the FH transmission quality is designed in accordance with the low MCS terminal, the FH residual distortion resistance of the high MCS terminal is lower than that of the low MCS terminal, so that a signal quality in the radio section of the high MCS terminal may not be able to be guaranteed. As a result of not being able to guarantee the signal quality, signal retransmission may occur between the terminal and the radio base station.

Therefore, regardless of whether the FH transmission quality is designed in accordance with the high MCS terminal or the low MCS terminal, FH transmission efficiency may decrease.

Outline of the Present Disclosure

Based on the above findings, the present disclosure describes a technique for improving the FH transmission efficiency. For example, the techniques shown in (1) to (4) below will be described.

(1) It is assumed that a high MCS terminal and a low MCS terminal can coexist in a mixed manner in an area (sometimes referred to as a cell) covered by a base station. The high MCS terminal is an example of a terminal (high signal quality terminal) in which a radio communication quality (in other words, signal quality) with the base station is relatively high compared to other terminals in a cell. On the other hand, the low MCS terminal is an example of a terminal (low signal quality terminal) in which the radio signal quality with the base station is relatively low compared to other terminals in the cell. High or low signal quality can be caused by different radio propagation environments (or propagation conditions) such as a distance between the terminal and the base station and the presence or absence of a shield.

(2) A resource that can be used for FH transmission (hereinafter sometimes referred to as an "FH resource") is partitioned into a plurality of different intervals. The "interval" may be, for example, an interval on at least one of a time axis and a frequency axis. The number of intervals (n) partitioned for the FH transmission may be two or more. Each of the two or more divided intervals may be represented as an interval #j (j is any of 1 to n). As a non-limiting example, the number of partitioned intervals n=2 (j=1 or 2) is assumed below.

(3) Scheduling (in other words, assignment control of the FH resource) is performed in which the low MCS terminal is assigned (or multiplexed) to a first interval #1, and the high MCS terminal is assigned (or multiplexed) to a second interval #2. Classification (or distinction or identification) between the low MCS terminal and the high MCS terminal may be performed, for example, based on a threshold value based on FH transmission quality (or a range defined by two threshold values). The threshold value may be a predetermined value as a non-limiting example. There may be three or more threshold values.

(4) Different FH transmission schemes may be applied to interval #1 and interval #2. The FH transmission scheme may be determined by, for example, at least one of an error correction code type (hereinafter sometimes abbreviated as a "code type"), a coding rate, and a transmission parameter such as a modulation multilevel number or multiple optical wavelengths. The code type is an example of information indicating the code type such as a Reed-Solomon code, a low density parity check (LDPC) code, and a Polar code. The "code type" is not limited to a block code, and may include a convolutional code such as a turbo code.

Interval

In the above (2), a unit of the interval (that is, time interval) on the time axis of the FH transmission may be, for example, a unit corresponding to the time interval (or time resource) of a radio resource such as a mini slot (or subslot), a slot, a subframe, or a radio frame. The "slot" may be composed of, for example, a plurality of "mini slots".

The "subframe" may composed of, for example, one or a plurality of "slots". The "radio frame" may be composed of, for example, a plurality of "subframes". Other names may be used for the units of these time intervals. For example, the time interval may be referred to as TTI (transmission time interval).

On the other hand, a unit of the interval (that is, frequency band) on the frequency axis of the FH transmission may be a unit corresponding to a frequency interval (or frequency resource) of a radio resource such as RB and BWP (bandwidth part).

One or a plurality of RBs may be described as terms such as physical resource block (PRB), subcarrier group, resource element group (REG), PRB pair, and RB pair. The RB may be consist of one or a plurality of resource elements (REs). For example, one RE may be consist of one subcarrier and one symbol. Other names may be used for the units of these frequency intervals.

Although the unit of the "interval" (in other words, FH resource) of the time axis or the frequency axis in the FH transmission may be different from the unit of the resource (radio resource) in the radio transmission as described above, signal processing of an FH transmission signal can be simplified by making the units of both uniform. For example, the unit of the FH resource may be made uniform with the unit of scheduling for the radio resource. The signal processing of the FH transmission signal may include, for example, coding and modulation on an FH transmission side, and demodulation and decoding on an FH reception side.

First Exemplary Embodiment

FIG. 1 is a diagram showing an example of a configuration of a radio communication system according to a first exemplary embodiment. As illustrated in FIG. 1, the radio communication system includes, for example, radio base station 1 and UE 2, which is an example of a terminal. The number of each of radio base stations 1 and UEs 2 may be two or more.

UE 2 is connected to radio base station 1 by a radio connection to perform communication. The radio communication between UE 2 and radio base station 1 includes at least one of uplink (UL) communication and downlink (DL) communication. In the following, an example of the configuration and operation focusing on the DL of radio base station 1 will be described. An example focusing on the UL will be described later in third and fourth exemplary embodiments.

Radio base station 1 includes, for example, master station device 11 and secondary station device 12 that are interconnected by FH 13. Master station device 11 may be referred to as, for example, BBU, CBBU (centralized baseband unit), REC, or CU (central unit). Secondary station device 12 may be referred to as, for example, RRH, RE, or DU (distributed unit). One master station device 11 may be connected to two or more secondary station devices 12. One secondary station device 12 may be connected to two or more UEs 2.

By way of example, wired transmitting means (or a wired interface) such as a UTP cable, an STP cable, or an optical fiber cable may be applied to FH 13. The wired interface may be, for example, an interface complying with standards or technologies such as CPRI (common public radio interface), eCPRI (evolved CPRI), OBSAI (open base station architecture initiative), RoE (radio over Ethernet), and RoF (radio over fiber). "Ethernet" is a registered trademark.

Master Station Device 11

Figure 2:
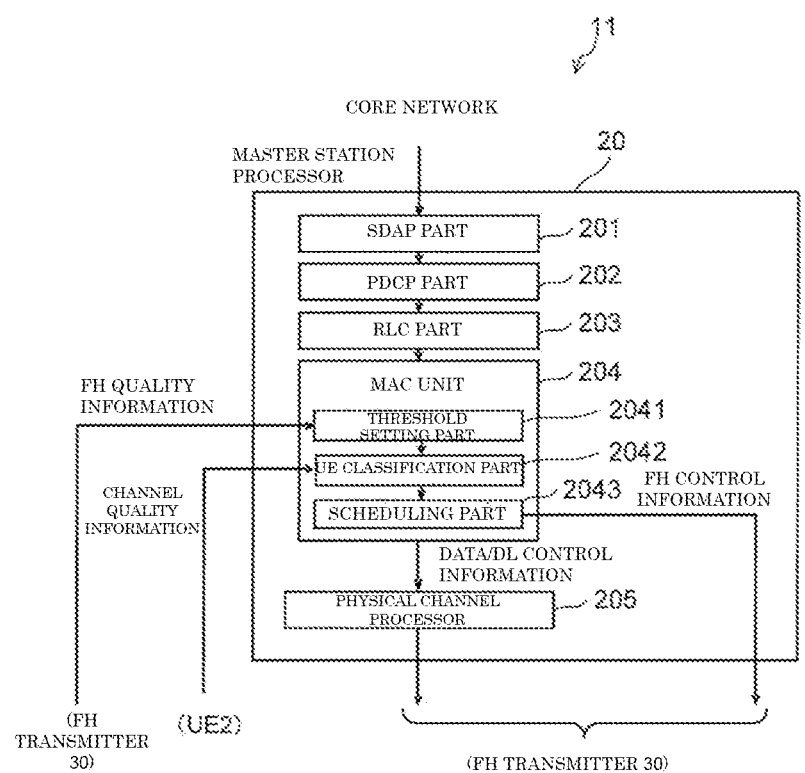
FIG. 2 is a diagram showing an example of a configuration of a master station processor in a master station device illustrated in FIG. 1.
Figure 3:
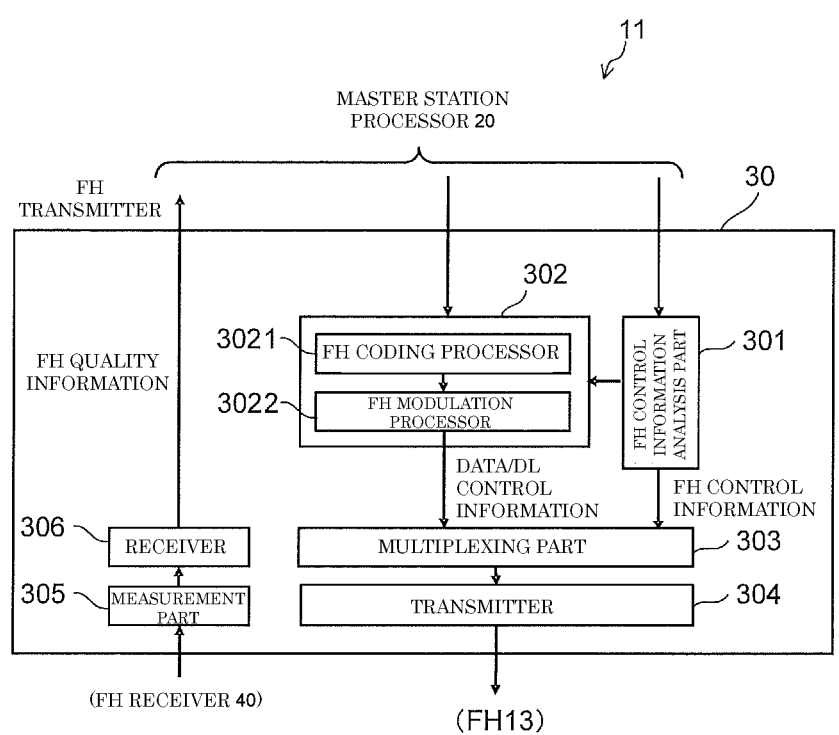
FIG. 3 is a diagram showing an example of a configuration of an FH transmitter in the master station device illustrated in FIG. 1.

As illustrated in FIG. 1, master station device 11 includes, for example, master station processor 20 and FH transmitter 30. FIG. 2 shows an example of a configuration of master station processor 20, and FIG. 3 shows an example of a configuration of FH transmitter 30.

Master Station Processor 20

As illustrated in FIG. 2, master station processor 20 includes, for example, SDAP (service data adaptation protocol) part 201, PDCP (packet data convergence protocol) part 202, RLC (radio link control) part 203, MAC (medium access control) unit 204 and physical channel processor 205.

For example, a signal (for example, user data) sent from a higher-level core network (for example, EPC or 5GC) is input to SDAP part 201. "EPC" is an abbreviation for "evolved packet core", and 5GC is an abbreviation for "5th generation (5G) core network". 5G stands for a 5th generation radio access technology (RAT) and is sometimes referred to as NR (new radio). In addition, 5GC is sometimes referred to as NGC (next generation core network).

For example, SDAP part 201 performs mapping between a QoS (quality of service) flow and a radio bearer, adds an SDAP header to a signal (for example, a packet) sent from a higher-level core network, and outputs the signal to PDCP part 202.

PDCP part 202 performs processing, such as encryption of user data and header compression, on the output of SDAP part 201, and outputs a PDCP PDU (protocol data unit) to RLC part 203.

RLC part 203 performs processing, such as error detection and retransmission control by ARQ (automatic repeat request), on the output of PDCP part 202, and outputs an RLC PDU.

For example, MAC unit 204 performs retransmission control by HARQ (hybrid automatic repeat request), determines UE 2 to assign a communication opportunity by scheduling, determines MCS in radio transmission, and generates an MAC PDU from the RLC PDU to output a transport block. In the determination of the MCS, channel quality information (for example, CQI (channel quality indicator)) fed back from UE 2 may be used.

Since there is a correlation (or association) between the CQI and the MCS as described above, the CQI may be described as the MCS (or MCS index). Since the CQI is an example of a reception quality index in UE 2, the CQI may be described as a quality index different from the CQI, such as an RSSI (received signal strength indicator) or an SNR (signal-to-noise ratio).

MAC unit 204 may include, for example, threshold setting part 2041, UE classification part 2042, and scheduling part 2043.

FH quality information from FH transmitter 30 may be input to threshold setting part 2041. The FH quality information is an example of an index of transmission quality in an FH transmission interval. As a non-limiting example, SNR may be used for the FH quality information.

Threshold setting part 2041 determines a threshold value (or threshold range) for switching an FH transmission scheme, for example, based on the FH quality information, and outputs information (hereinafter sometimes referred to as "threshold information") indicating the determined threshold value (or threshold range) to UE classification part 2042.

The threshold value (or threshold range) may be determined, for example, to a value (or range) in which the higher the quality exhibited by the FH quality information, the higher the number of UEs 2 to which a high MCS is applied (in other words, in which FH residual distortion resistance is low).

Conversely, as the FH quality information exhibits a lower quality, the threshold value (or threshold range) may be determined, for example, to a value (or threshold range) in which the number of UEs 2 to which low MCS is applied (in other words, in which the FH residual distortion resistance is high) increases.

The threshold information determined by threshold setting part 2041 and the CQI fed back from UE 2 by a UL signal may be input to UE classification part 2042. UE classification part 2042 classifies UE 2 into a UE group to which the high MCS is applied (in which the FH residual distortion resistance is low) and a UE group to which the low MCS is applied (in which the FH residual distortion resistance is high), for example, based on the threshold information and the CQI. The number of UE groups into which they are classified may be two or more as in a partitioned interval of an FH resource.

Information on the UE group (hereinafter sometimes referred to as "UE classification information") is output to scheduling part 2043 together with the CQI of each UE 2, for example. The number of UEs 2 constituting the UE group may be "1".

Scheduling part 2043 determines UE 2 to which the communication opportunity (for example, radio resource and FH resource) is assigned from UE 2 in the classified UE group, for example, based on UE classification information from UE classification part 2042. Scheduling part 2043 outputs, for example, a DL signal addressed to UE 2 that has determined the assignment of the communication opportunity to physical channel processor 205.

Furthermore, scheduling part 2043 outputs, for example, control information on the FH transmission scheme (hereinafter sometimes referred to as "FH control information"), applied when FH transmitter 30 transmits, to FH 13, a signal of the UE group for which the assignment of the communication opportunity is determined, to FH transmitter 30. The FH control information may include, for example, information on the FH transmission scheme for each interval #j (hereinafter sometimes referred to as "FH transmission scheme information #j").

The DL signal output to physical channel processor 205 may include, for example, at least one of user data and DL control information (sometimes referred to as "UE control information" or "radio control information") used by UE 2 for decoding the user data.

The DL control information may include information (or parameter related to radio communication) such as MCS and mapping information for an assigned radio resource (for example, RB, RE).

In physical channel processor 205, the user data is mapped to, for example, a resource of a PDSCH (physical downlink shared channel), which is an example of a physical data channel, and DL control information is mapped to, for example, a resource of a PDCCH (physical downlink control channel), which is an example of a physical control channel.

For example, physical channel processor 205 performs signal processing for configuring (or generating) a signal of the PDSCH, such as coding processing, scrambling processing, modulation processing, and RE mapping processing, on the user data. Furthermore, physical channel processor 205 performs, for example, signal processing for configuring a signal of the PDCCH on the DL control information, based on the control information used by UE 2 for demodulating the PDSCH signal. The signal processing by physical channel processor 205 may be described as "physical layer processing".

The coding processing may include, for example, processing of adding a CRC (cyclic redundancy check) code to the transport block input from MAC unit 204 and split the transport block into code blocks. Furthermore, the coding processing may include, for example, coding of the code block and rate matching corresponding to the MCS.

For example, a modulation scheme such as QPSK (quadrature phase shift keying), 16QAM (quadrature amplitude modulation), 64QAM, or 256QAM may be applied to the modulation processing.

When MIMO (multiple-input and multiple-output) transmission is applied in a radio transmission interval, processing in physical channel processor 205 may include, for example, a layer mapping processing and precoding processing.

An output signal of physical channel processor 205 is transmitted to, for example, FH transmitter 30. A channel processed by physical channel processor 205 is not limited to PDSCH and PDCCH. A signal of a DL channel of another name such as a broadcast channel (PBCH: physical broadcast channel) may be processed in physical channel processor 205.

The signal output from physical channel processor 205 may be collectively referred to as "physical channel signal" for convenience. Furthermore, the signals output from physical channel processor 205 may be transmitted to FH transmitter 30 in parallel by physically different signal lines, or may be multiplexed in one physical signal line and transmitted to FH transmitter 30. Non-limiting examples of multiplex schemes include time division multiplexing (TDM), frequency division multiplexing (FDM), code division multiplexing (CDM), and wavelength division multiplexing (WDM).

The FH control information output from scheduling part 2043 may be multiplexed with the output signal of physical channel processor 205 and transmitted to FH transmitter 30. Alternatively, the FH control information may be physically separated and transmitted to FH transmitter 30 without being multiplexed with the physical channel signal.

FH Transmitter 30

Next, an example of the configuration of FH transmitter 30 will be described with reference to FIG. 3. As illustrated in FIG. 3, FH transmitter 30 includes, for example, FH control information analysis part 301, FH transmission processor 302, multiplexing part 303, transmitter 304, receiver 305, and measurement part 306.

FH control information analysis part 301 determines the FH transmission scheme (for example, FH transmission parameters such as code type, coding rate, and modulation multilevel number) applied to the interval #j, for example, based on the FH control information of the interval #j input from master station processor 20 (for example, scheduling part 2043 of MAC unit 204). Furthermore, FH control information analysis part 301 outputs, for example, FH control information, including FH transmission scheme information #j of the determined interval #j, to FH transmission processor 302.

FH transmission processor 302 includes, for example, FH coding processor 3021 and FH modulation processor 3022.

For example, FH coding processor 3021 encodes the physical channel signal of interval #j input from master station processor 20 and outputs the signal to FH modulation processor 3022, in accordance with the code type and the coding rate included in FH transmission scheme information #j input from FH control information analysis part 301.

For example, FH modulation processor 3022 modulates an output signal corresponding to interval #j of FH coding processor 3021 to a multilevel modulation signal, such as QPSK, 16QAM, 64QAM, or 256QAM, in accordance with the modulation multilevel number included in FH transmission scheme information #j. The modulation signal is output to multiplexing part 303. The "modulation multilevel number" is not limited to 256 or less, and may be, for example, a multilevel number larger than 256.

Multiplexing part 303 multiplexes, for example, an output signal of FH transmission processor 302 (FH modulation processor 3022) and the FH control information including FH transmission scheme information #j output from FH control information analysis part 301 and outputs to transmitter 304. The FH control information is used, for example, to demodulate and decode the FH transmission signal for each interval #j in FH receiver 40 of secondary station device 12. As a non-limiting example, any of TDM, FDM, and CDM may be applied to the multiplex scheme in multiplexing part 303.

For example, transmitter 304 performs, on an output signal of multiplexing part 303, transmission processing (for example, packet configuration processing or header addition processing) according to, for example, wired transmitting means (or wired interface) such as a UTP cable, an STP cable, or an optical fiber cable and performs transmission to FH 13.

When an optical fiber cable is used, for example, transmitter 304 may be provided with an electrical/optical (E/O) converter (not shown). WDM may be applied in the E/O converter. In other words, a plurality of signals transmitted from master station device 11 to FH 13 may be multiplexed by any one of TDM, FDM, CDM, and WDM.

Multiplexing part 303 may be omitted. For example, the physical channel signal and the FH control information may be physically separated and transmitted to secondary station device 12 without being multiplexed. When multiplexing part 303 is omitted, separator 402 (described later in FIG. 4) in FH receiver 40 of secondary station device 12 may also be omitted.

Receiver 305 receives a signal transmitted from FH receiver 40 of secondary station device 12 to FH 13 toward master station device 11, for example, a known signal (for example, training signal) between master station device 11 and secondary station device 12 and outputs the signal to measurement part 306.

Measurement part 306 measures, for example, a reception quality (in other words, transmission quality of FH 13) of the signal input from receiver 305, and outputs the quality measurement result as, for example, the FH quality information to master station processor 20 (for example, threshold setting part 2041 of MAC unit 204). The FH quality information may be transmitted to master station processor 20 through FH 13, or may be transmitted to master station processor 20 through a communication path different from FH 13.

Figure 4:
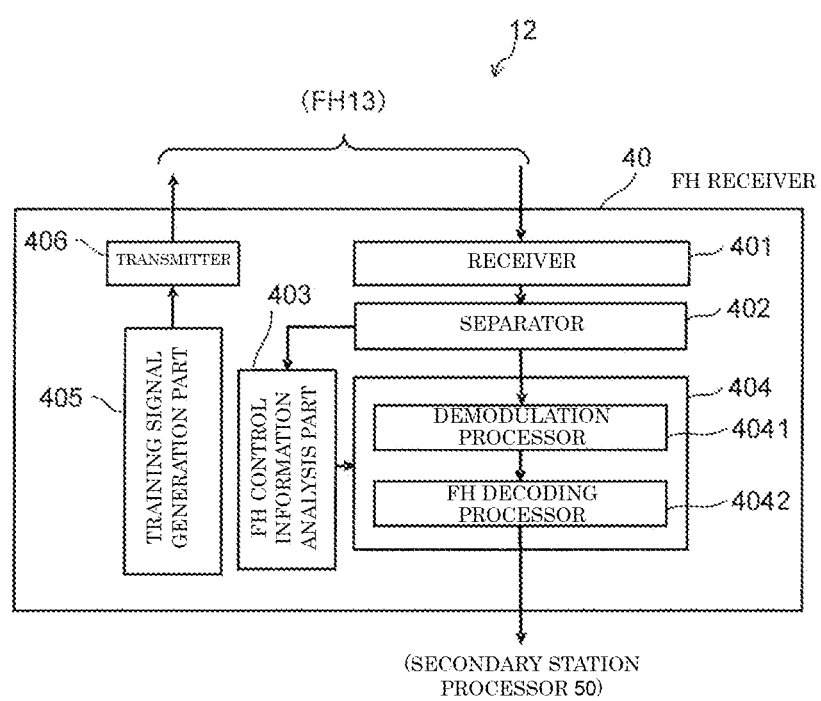
FIG. 4 is a diagram showing an example of a configuration of an FH receiver in a secondary station device illustrated in FIG. 1.

Although not shown in FIGS. 2 to 4, the channel quality information UL-transmitted (fed back) by UE 2 is output (or transmitted) to master station processor 20 (for example, UE classification part 2042) via secondary station processor 50, FH receiver 40, and FH transmitter 30.

One or both of receiver 305 and measurement part 306 may be provided in master station device 11, and may be provided in a functional block different from FH transmitter 30 in master station device 11.

Secondary Station Device 12

Figure 5:
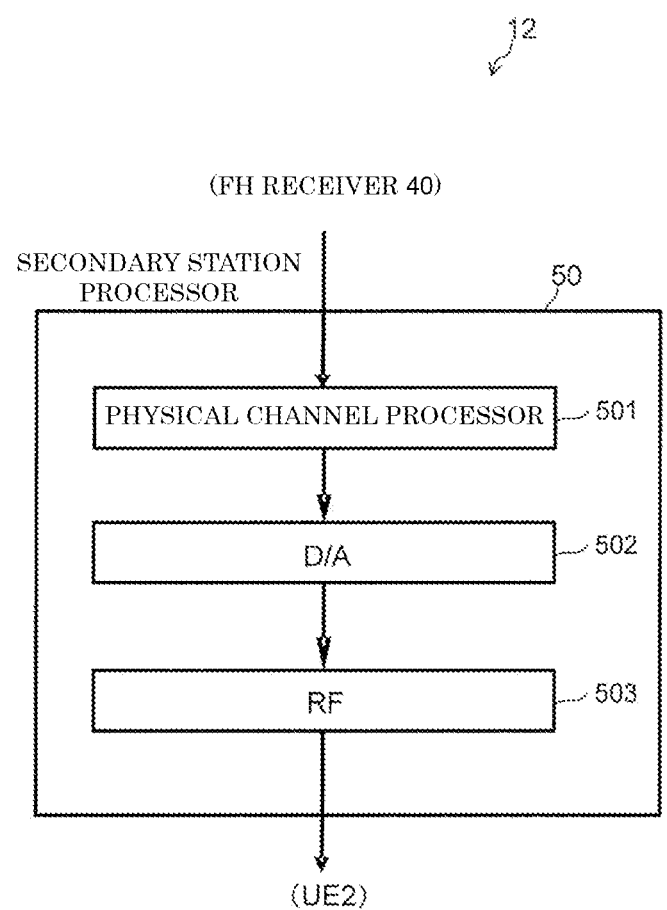
FIG. 5 is a diagram showing an example of a configuration of a secondary station processor in the secondary station device illustrated in FIG. 1.

Next, an example of a configuration of secondary station device 12 illustrated in FIG. 1 will be described. As illustrated in FIG. 1, secondary station device 12 includes, for example, FH receiver 40 and secondary station processor 50. FIG. 4 shows an example of a configuration of FH receiver 40, and FIG. 5 shows an example of a configuration of secondary station processor 50.

FH Receiver 40

As illustrated in FIG. 4, FH receiver 40 includes, for example, receiver 401, separator 402, FH control information analysis part 403, FH reception processor 404, training signal generation part 405, and transmitter 406.

For example, receiver 401 performs, on the signal received from FH 13, reception processing according to wired transmitting means (or wired interface) such as a UTP cable, an STP cable, or an optical fiber cable and outputs the signal to separator 402.

For example, separator 402 separates the FH control information and the physical channel signal included in an output signal of receiver 401, outputs the FH control information to FH control information analysis part 403, and outputs the physical channel signal to FH reception processor 404.

FH control information analysis part 403 specifies (or identifies) the FH transmission scheme applied to interval #j in FH transmitter 30 of master station device 11, for example, based on the FH control information of interval #j and outputs information on the specified FH transmission scheme of interval #j to FH reception processor 404. FH control information analysis part 403 in FH receiver 40 may be made common to FH control information analysis part 301 in FH transmitter 30 inside radio base station 1.

FH reception processor 404 includes, for example, FH demodulation processor 4041 and FH decoding processor 4042.

FH demodulation processor 4041 applies demodulation processing, corresponding to modulation processing applied to the interval #j in FH transmitter 30 of master station device 11, to the physical channel signal from separator 402, for example, based on FH transmission scheme information #j of the FH control information input from FH control information analysis part 403. The signal demodulated by this demodulation processing is output to FH decoding processor 4042.

FH decoding processor 4042 applies the decoding processing, corresponding to the coding processing applied to interval #j in FH transmitter 30, to the output signal of FH demodulation processor 4041, for example, based on FH transmission scheme information #j. The physical channel signal is decoded by this decoding processing and transmitted to secondary station processor 50.

For example, training signal generation part 405 generates a known signal for measuring the transmission quality of FH 13 and outputs the signal to transmitter 406. A non-limiting example of the "known signal" is a training signal (or data) that is used by designating a predetermined sequence in advance between transmission and reception. The training signal may be described as another name such as a pilot signal or a reference signal.

Transmitter 406 transmits, for example, the training signal to FH 13 connected to master station device 11. The training signal transmitted to FH 13 is received, for example, by receiver 305 (see FIG. 3) of FH transmitter 30 in master station device 11.

The transmission quality of FH 13 may be measured, for example, by transmitting the training signal in an opposite direction (in other words, DL direction). For example, the training signal transmitted from FH transmitter 30 of master station device 11 to FH receiver 40 of secondary station device 12 may be received and measured in FH receiver 40, and the measurement result may be fed back to FH transmitter 30.

One or both of training signal generation part 405 and transmitter 406 may not be provided inside FH receiver 40, and may be provided inside secondary station device 12.

Secondary Station Processor 50

As illustrated in FIG. 5, secondary station processor 50 includes, for example, physical channel processor 501, D/A (digital to analog) converter 502, and radio frequency (RF) part 503.

Physical channel processor 501 performs signal processing on the physical channel signal included in the FH transmission signal demodulated and decoded in FH receiver 40. This signal processing may include, for example, beamforming processing, IFFT (inverse fast Fourier transform) processing, and CP (cyclic prefix) insertion processing. The signal processing by physical channel processor 501 may be described as "physical layer processing". When beamforming is not performed in secondary station device 12, the beamforming process may be omitted.

Physical channel processor 205 in master station processor 20 and physical channel processor 501 in secondary station processor 50 have a relationship in which by a functional split point between master station device 11 and secondary station device 12, while some of a plurality of signal processing (functions) with respect to the physical channel signal are performed in the former, the remaining processing is performed in the latter. As will be described later, although there are a plurality of types of functional split points, any of the functional split points may be applied in the first exemplary embodiment and second to fourth exemplary embodiments described later.

D/A converter 502 converts, for example, an output signal of physical channel processor 501 from a digital signal to an analog signal.

For example, RF part 503 performs transmission RF processing, such as up-conversion processing to a radio frequency and amplification processing, on an output of D/A converter 502. A radio signal generated by the transmission RF processing is radiated into a space (for example, transmitted to UE 2) via an antenna (not shown) provided in RF part 503, for example.

Operation Example

Next, an example of operation of the radio communication system according to the first exemplary embodiment will be described with reference to a sequence diagram of FIG. 6.

Figure 6:
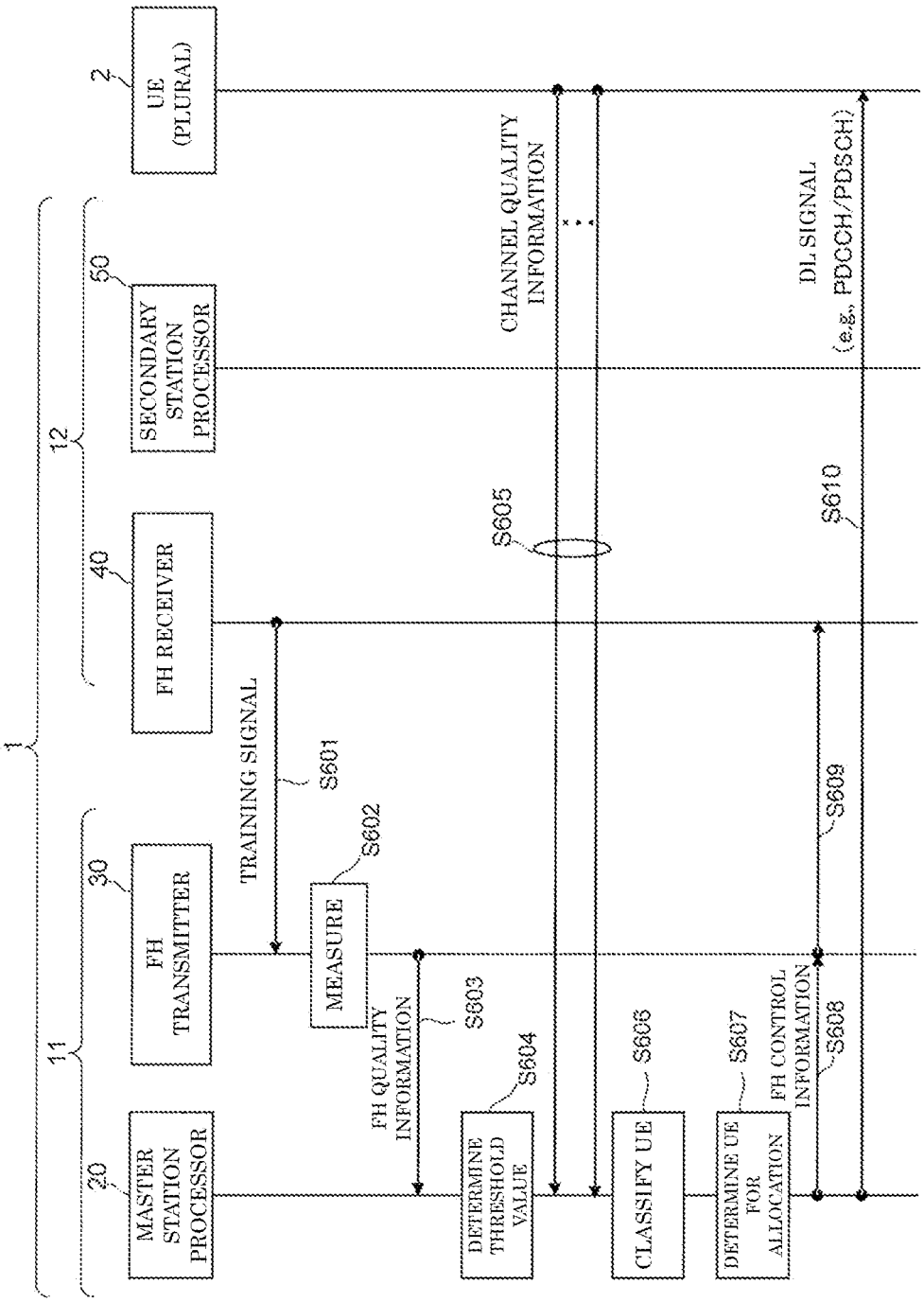
FIG. 6 is a sequence diagram showing an operation example according to the first exemplary embodiment.

As illustrated in FIG. 6, in radio base station 1, a training signal is transmitted from transmitter 406 (see FIG. 4) of FH receiver 40 in secondary station device 12 to FH 13 toward master station device 11 (S601). The training signal may be transmitted, for example, when the radio communication system is activated or at a predetermined timing after the activation.

The predetermined timing may be set to, for example, a time zone (for example, early morning or late night) in which a traffic amount of FH 13 is relatively low in consideration of reducing tightness of an FH band. The training signal may be transmitted (in other words, retransmitted) from FH receiver 40 at an appropriate timing in order to cope with (for example, compensate or calibrate) a secular change of an FH transmission quality.

For example, the training signal is received by receiver 305 (see FIG. 3) of FH transmitter 30 and is input to measurement part 306. Measurement part 306 measures the reception quality (for example, SNR) of the input training signal (S602).

Information (measurement information) indicating the measurement result by measurement part 306 is output to, for example, MAC unit 204 (for example, threshold setting part 2041) of master station processor 20 (S603).

In master station processor 20, threshold setting part 2041 determines (or sets) a threshold value (or threshold range) for switching the FH transmission scheme based on the FH quality information (S604). As a non-limiting example, threshold setting part 2041 determines (or sets) MCS index=11 as the threshold value in MCS table 700 illustrated in FIG. 7. The determined threshold information is output to UE classification part 2042.

The threshold information may be predetermined (or reset) according to a change in the FH transmission quality due to the retransmission of the training signal described above. MCS table 700 is an example of information showing a plurality of combinations (or associations) of radio parameters that define radio transmission schemes, such as a modulation order and a coding rate, in association with an index (MCS index).

UE classification part 2042 classifies (or groups) UE 2 based on the threshold information from threshold setting part 2041 and the channel quality information (S605) fed back from UE 2 (S606).

Figure 7:
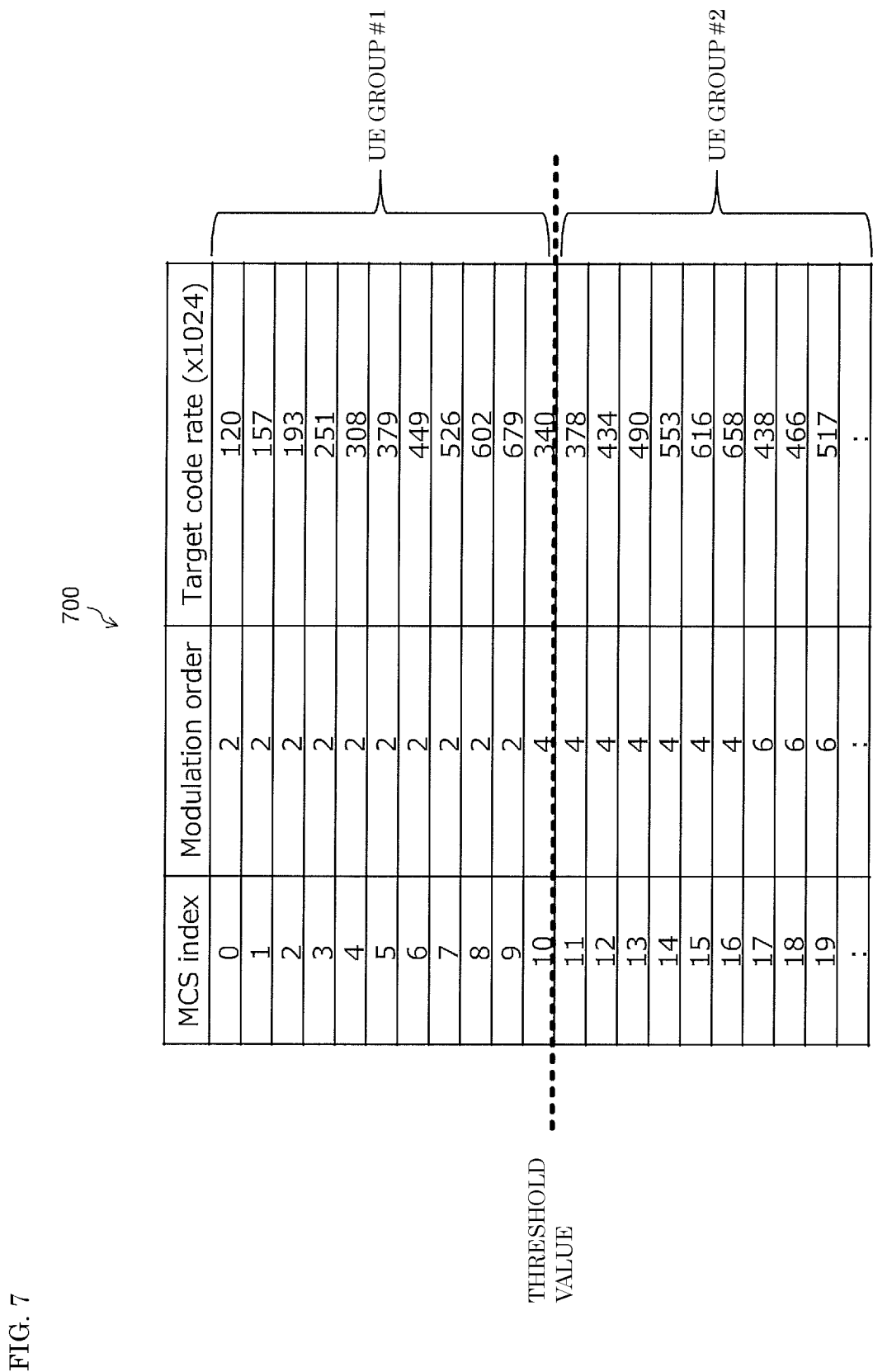
FIG. 7 is a diagram showing an example of threshold setting according to the first exemplary embodiment.

For example, as shown in FIG. 7, UE classification part 2042 classifies UE 2 to which MCS index=less than 11 (that is, 0 to 10) is applied according to the channel quality information into group #1 (low MCS terminal group). On the other hand, UE classification part 2042 classifies UE 2 to which MCS index=11 or more is applied according to the channel quality information into group #2 (high MCS terminal group).

In FIG. 7, "Modulation order" k=2 represents the modulation multilevel number=4 (QPSK), k=4 represents the modulation multilevel number=16 (16QAM), k=6 represents the modulation multilevel number=64 (64QAM), and k=8 represents the modulation multilevel number=256 (256QAM).

In the threshold setting illustrated in FIG. 7, at least different coding rates are applied to each other between UE group #1 and UE group #2 (in other words, between interval #1 and interval #2). For the modulation multilevel number (modulation order k), QPSK (k=2) or 16QAM (k=4) is applied to UE group #1, and 16QAM (k=4) or 64QAM (k=6) or more is applied to UE group #2. In other words, in the threshold setting example of FIG. 7, the same modulation multilevel number may be applied to UE group #1 and UE group #2. It may be understood that the FH transmission scheme is different if at least one of a plurality of parameters that define the FH transmission scheme is different.

MCS table 700 illustrated in FIG. 7 may be stored in, for example, a storage unit (not shown) to which UE classification part 2042 is accessible. The storage unit may be provided in UE classification part 2042 or inside MAC unit 204, or may be provided outside MAC unit 204 and inside master station processor 20. Alternatively, the storage unit may be provided in, for example, an external device of master station device 11 accessible via a communication line.

Information on the classified UE group (UE classification information) is output to scheduling part 2043 together with the channel quality information of each UE 2, for example.

Scheduling part 2043 determines UE 2 that assigns the communication opportunity in accordance with the classified UE group, for example, based on the UE classification information from UE classification part 2042 (S607).

Figure 8A:
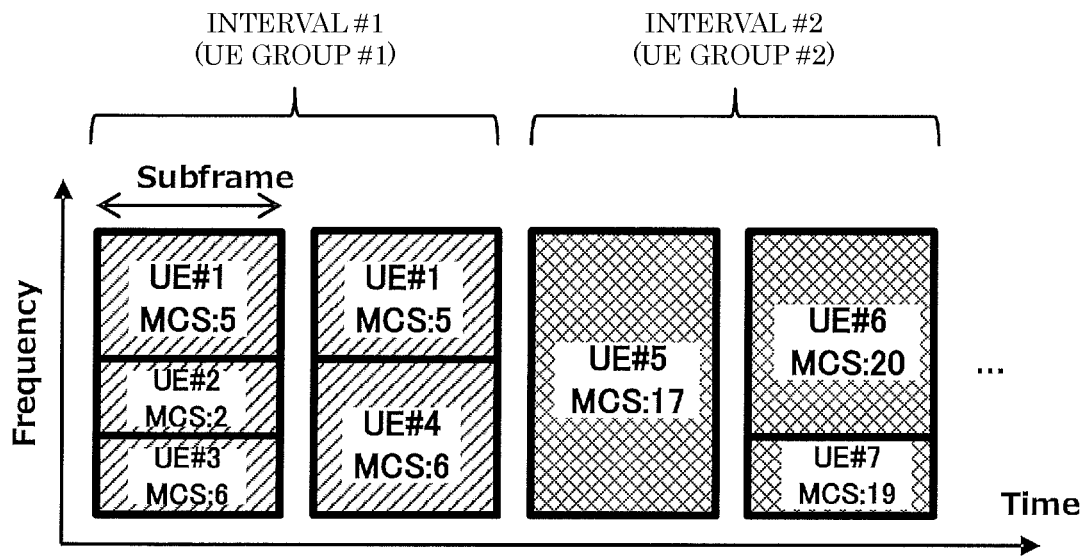
FIG. 8A is a diagram showing an example of assignment of an FH resource (time interval) according to the first exemplary embodiment.

FIG. 8A shows a non-limiting example of the assignment of the communication opportunity (in other words, scheduling) by scheduling part 2043, focusing on the FH resource.

In FIG. 8A, interval #1 is assigned with UE group #1 (UE #1 to #4) to which the low MCS with the MCS index less than a threshold value (11), such as 2, 5, or 6, is applied. Interval #2 is assigned with UE group #2 (UE #5 to #7) to which the high MCS with the MCS index being the threshold value or more, such as 17, 19, or 20, is applied.

Here, since UE group #1 to which the low MCS is applied (in other words, in which the FH residual distortion resistance is high) is assigned to interval #1, the FH transmission scheme in which error tolerance is lower than that in interval #2 may be applied.

As a non-limiting example, scheduling part 2043 may apply code rate (R)=1 (that is, no error correction) and 16QAM to the FH transmission scheme of interval #1, and may apply code rate (R)=5/6 and QPSK to the FH transmission scheme of a signal of interval #2.

In each of interval #1 and interval #2, UE 2 may be assigned with a resource divided on at least one of the time axis and the frequency axis.

For example, as shown in FIG. 8A, each of interval #1 and interval #2 may be divided into intervals (hereinafter sometimes referred to as "subframe intervals") corresponding to a plurality of (for example, two) subframes on the time axis.

In a first subframe interval of interval #1, for example, the DL signal addressed to each of UE #1 to UE #3 may be mapped (in other words, subjected to FDM) to different frequency resources. In a second subframe interval of interval #1, for example, the DL signal addressed to each of UE #1 and UE #4 may be subjected to FDM.

Similarly, in the second subframe interval of interval #2, for example, the DL signal addressed to each of UE #6 and UE #7 may be subjected to FDM. In the first subframe interval of interval #2, for example, the DL signal addressed to UE #5 may be mapped without being subjected to FDM with another DL signal addressed to UE 2. In other words, the frequency resource (for example, a plurality of RBs) available for FDM of the DL signal addressed to each of the plurality of UEs 2 may be assigned to (or occupied by) one DL signal addressed to UE 2 (the same applies in the following description).

A length (interval length) of each of interval #1 and interval #2 may be fixed or may be adaptively changed depending on the number of UEs 2 constituting one UE group. For example, scheduling part 2043 may set a longer interval length for the UE group having the larger number of UEs.

Figure 8B:
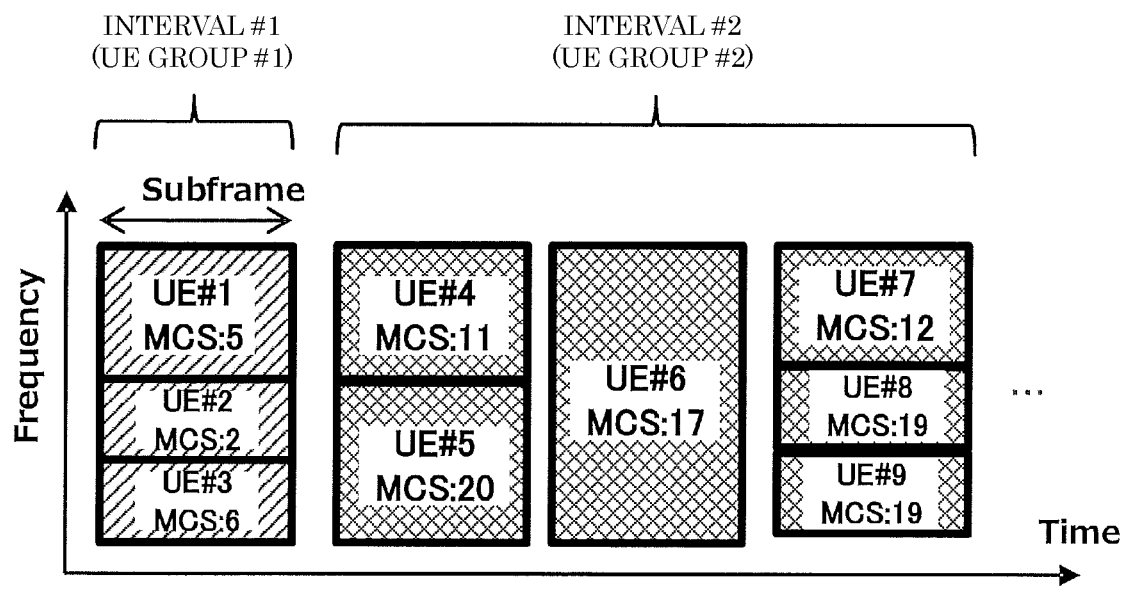
FIG. 8B is a diagram showing another example of assignment of the FH resource (time interval) according to the first exemplary embodiment.

FIG. 8B shows a non-limiting example. FIG. 8B shows an example of scheduling when the number of UEs (for example, six UEs #4 to #9) in UE group #2 to which the high MCS is applied is larger than the number of UEs (for example, three UEs #1 to #3) in UE group #1 to which the low MCS is applied.

In this case, as illustrated in FIG. 8B, scheduling part 2043 may set the length of the interval #2 to which UE group #2 to which the high MCS is applied is assigned longer than the length of interval #1. As in FIG. 8A, in FIG. 8B, to interval #1 to which UE group #1 of the low MCS is assigned, for example, the FH transmission scheme in which the error tolerance is lower than that in interval #2 may be applied.

In the example of FIG. 8B, the scheduling in interval #1 may be the same as in FIG. 8A. On the other hand, in a first subframe of interval #2, for example, the DL signal addressed to each of UE #4 and UE #5 may be subjected to FDM. In a third subframe of interval #2, for example, the DL signal addressed to each of UE #7 and UE #9 may be subjected to FDM. In a second subframe of interval #2, the DL signal addressed to UE #6 may be mapped without being subjected to FDM with another DL signal addressed to UE 2.

The setting (or control) of the interval length described above in FIG. 8B may be performed based on an amount of the FH resource assigned to one UE group. For example, a longer interval length may be set for the UE group in which a total amount of the FH resource assigned is large even if the number of UEs is small.

In FIG. 6, scheduling part 2043 transmits, for example, the FH control information, including FH transmission scheme information #1 and #2 applied to the respective signals of scheduled UE groups #1 and #2, from FH transmitter 30 to FH receiver 40 (S609).

The signals of scheduled UE groups #1 and #2 are processed by physical channel processor 205, and then transmitted to UE 2 via FH transmitter 30, FH 13, FH receiver 40, and secondary station processor 50 (S610).

In the scheduling illustrated in FIGS. 8A and 8B, UE group #1 of the low MCS is assigned to interval #1, and UE group #2 of the high MCS is assigned to interval #2. However, the present disclosure is not limited to this. For example, conversely, UE group #2 of the high MCS may be assigned to interval #1, and UE group #1 of the low MCS may be assigned to interval #2.

As described above, according to the first exemplary embodiment, different FH resources (for example, time intervals) are assigned to UE (for example, low MCS terminal) 2 having high FH residual distortion resistance and UE (for example, high MCS terminal) 2 having low FH residual distortion resistance.

In other words, UE 2 with the same or proximate (or similar) FH residual distortion resistance is scheduled to one time interval #j in the FH transmission. Therefore, since the FH transmission scheme applied can be optimized for each of the UE groups with the same or proximate FH residual distortion resistance in the FH transmission, FH transmission efficiency can be improved.

The scheduling to interval #j may be performed, for example, based on information on a service type of the DL signal addressed to UE 2 subjected to FH transmission, in addition to the UE classification information. For example, the DL signal for a service that requires low-delay transmission may be preferentially assigned to an interval that precedes in time among the plurality of intervals #j.

Second Exemplary Embodiment

Next, a second exemplary embodiment will be described with reference to FIGS. 9 to 12. In the first exemplary embodiment, an example of dividing the FH resource into a plurality of intervals #j on the time axis has been described, whereas in the second exemplary embodiment, an example of dividing the FH resource into a plurality of intervals #j on the frequency axis will be described.

Figure 9:
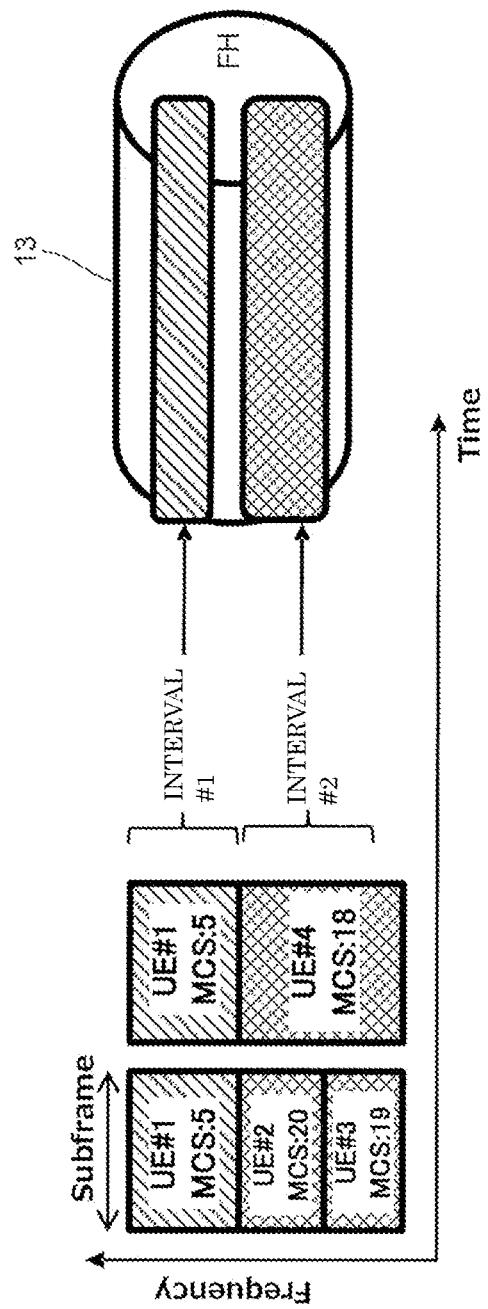
FIG. 9 is a diagram showing an example of assignment of an FH resource (frequency interval) according to a second exemplary embodiment.

FIG. 9 is a diagram showing an example of an interval in which the FH resource according to the second exemplary embodiment is divided on the frequency axis and scheduling for each interval. As illustrated in FIG. 9, the frequency resource that can be used for the FH transmission may be divided into a plurality of (for example, two) intervals #1 and #2.

For example, the DL signal addressed to UE #2 to which the low MCS (for example, MCS index=5) is applied (in other words, in which the FH residual distortion resistance is high) may be assigned to first interval #1.

Although FIG. 9 shows an example in which the DL signal addressed to UE #2 is assigned over a plurality of (for example, two) subframes in interval #1, the present disclosure is not limited to this. For example, in interval #1, the DL signal addressed to UE #2 may be assigned to one subframe, or the DL signal addressed to UE #2 may be assigned over three or more subframes.

On the other hand, for example, the DL signal addressed to each of UE #2, UE #3, and UE #4 to which the high MCS (for example, MCS index=18, 19, or 20) is applied (in other words, in which the FH residual distortion resistance is low) may be assigned to second interval #2.

For example, the DL signal addressed to UE #2 (MCS index=20) and the DL signal addressed to UE #3 (MCS index=20) may be mapped (in other words, subjected to FDM) to different frequency resources in the first subframe in interval #1. The DL signal addressed to UE #4 (MCS index=18) may be mapped to a second subframe of interval #2 without being subjected to FDM with another DL signal addressed to UE 2.

To interval #1 to which the UE group having high FH residual distortion resistance is assigned, for example, the FH transmission scheme in which the error tolerance is lower than that in interval #2 to which the UE group having low FH residual distortion resistance is assigned may be applied.

As a non-limiting example, as in the first exemplary embodiment, code rate (R)=1 (that is, no error correction) and 16QAM may be applied to the FH transmission scheme of interval #1, and code rate (R)=5/6 and QPSK may be applied to the FH transmission scheme of a signal of interval #2.

In FIG. 9, UE group #1 of the low MCS is assigned to interval #1, and UE group #2 of the high MCS is assigned to interval #2. However, the present disclosure is not limited to this. For example, conversely, UE group #2 of the high MCS may be assigned to interval #1, and UE group #1 of the low MCS may be assigned to interval #2.

Physically different FHs 13 may be prepared for different intervals #j. For example, the signal for each interval #j may be transmitted in parallel by physically different FHs 13, or may be multiplexed and transmitted in a physically single cable by a multiplexing method such as TDM, CDM, or WDM.

Hereinafter, an example of configurations of master station device 11 and secondary station device 12 according to the second exemplary embodiment will be described. An example of a configuration of radio base station 1 including master station device 11 and secondary station device 12 may be common to the first exemplary embodiment (FIG. 1).

Figure 10:
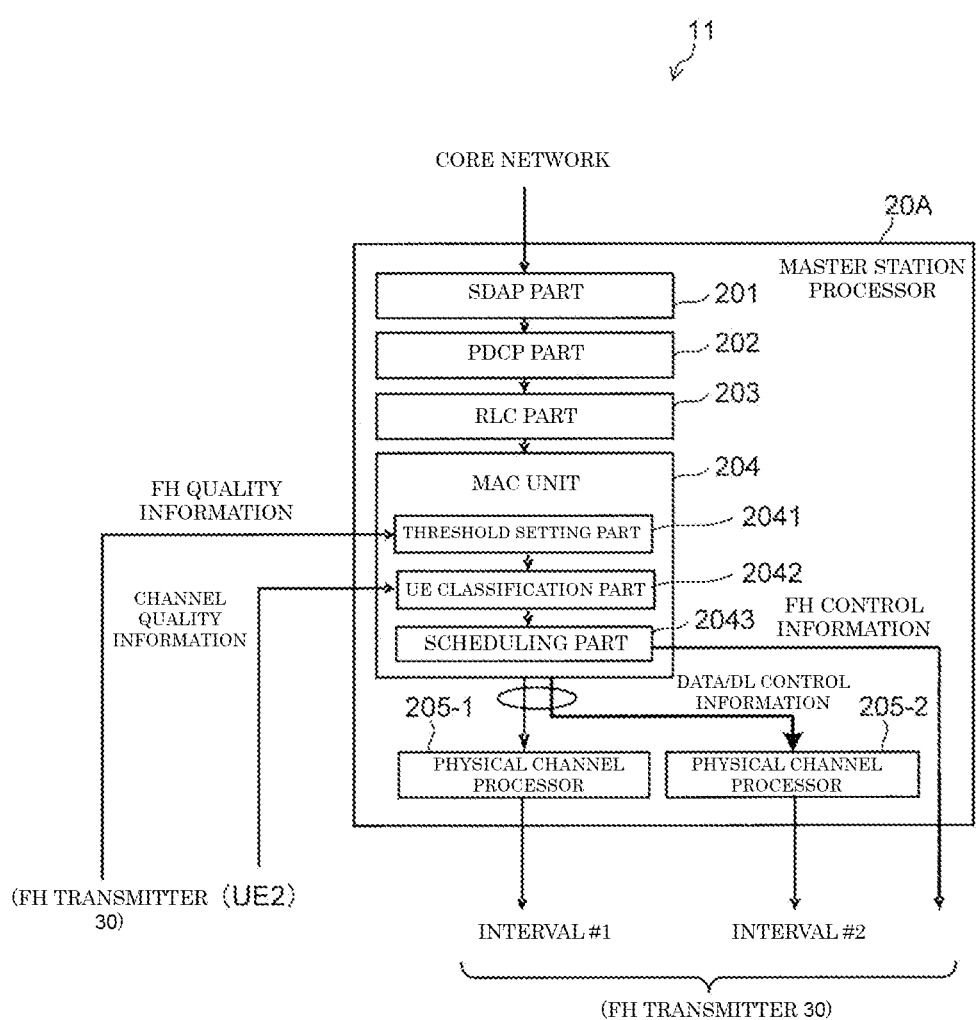
FIG. 10 is a diagram showing an example of a configuration of a master station processor in a master station device according to the second exemplary embodiment.
Figure 11:
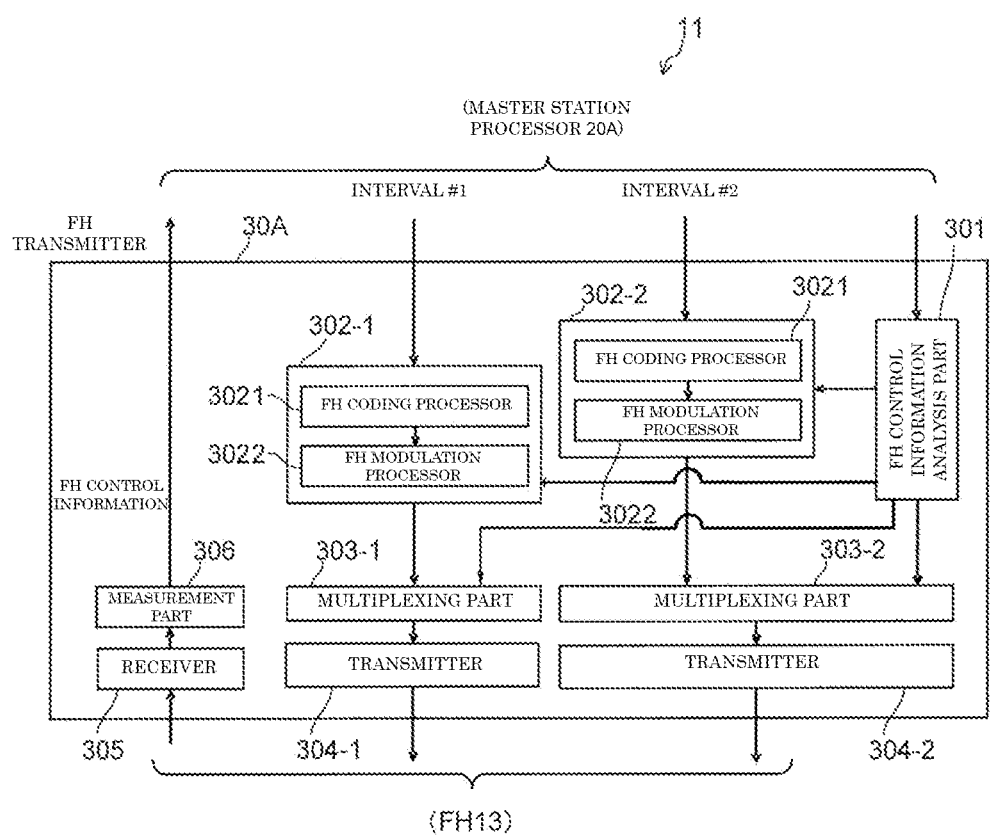
FIG. 11 is a diagram showing an example of a configuration of an FH transmitter in the master station device according to the second exemplary embodiment.

In the second exemplary embodiment, master station device 11 includes, for example, master station processor 20A shown in FIG. 10 and FH transmitter 30A shown in FIG. 11. On the other hand, in the second exemplary embodiment, secondary station device 12 includes, for example, FH receiver 40A shown in FIG. 12. In the second exemplary embodiment, secondary station processor 50 of secondary station device 12 may have the same configuration as that illustrated in FIG. 5.

Master Station Device 11

Master Station Processor 20A

As illustrated in FIG. 10, master station processor 20A in the second exemplary embodiment may have a configuration in which physical channel processor 205 is provided in accordance with a plurality of (frequency) intervals #j in the configuration illustrated in FIG. 2.

In FIG. 10, scheduling part 2043 determines UE 2 assigned to frequency interval #j from UE 2 in the classified UE group, for example, based on the UE classification information from UE classification part 2042. For example, scheduling part 2043 outputs the DL signal addressed to UE 2 assigned to frequency interval #j to physical channel processor 205-*j* corresponding to frequency interval #j. Furthermore, scheduling part 2043 outputs, for example, the FH control information, including FH transmission scheme information #j for each frequency interval #j, to FH transmitter 30A.

For example, each physical channel processor 205-*j* applies signal processing of physical channels, such as PDSCH and PDCCH, to the DL signal addressed to UE 2 assigned to frequency interval #j, as in the first exemplary embodiment. In other words, in the second exemplary embodiment, the DL signal addressed to UE 2 is signal-processed in parallel in accordance with frequency interval #j.

The FH control information may be multiplexed with the physical channel signal and transmitted to FH transmitter 30A, or may be physically separated and transmitted to FH transmitter 30A without being multiplexed with the physical channel signal. In master station processor 20A, physical channel processor 205 does not have to be provided in accordance with a plurality of (frequency) intervals #j. For example, one physical channel processor 205 may perform signal processing of the plurality of frequency intervals #j in parallel.

FH Transmitter 30A

On the other hand, as illustrated in FIG. 11, it may be understood that FH transmitter 30A has a configuration in which in the configuration illustrated in FIG. 3, FH transmission processor 302, multiplexing part 303, and transmitter 304 are provided in accordance with frequency interval #j.

Each FH transmission processor 302-*j* may be provided with a functional part equivalent to FH coding processor 3021 and FH modulation processor 3022 described in the first exemplary embodiment.

For example, multiplexing part 303-*j* multiplexes the DL signal (physical channel signal) subjected to parallel processing in accordance with frequency interval #j by FH transmission processor 302-*j* with the FH control information (FH transmission scheme information #j) input in accordance with frequency interval #j from FH control information analysis part 301.

For example, transmitter 304-*j* performs, on an output signal of corresponding multiplexing part 303-*j*, transmission processing (for example, packet configuration processing or header addition processing) according to, for example, wired transmitting means (or wired interface) such as a UTP cable, an STP cable, or an optical fiber cable and performs transmission to FH 13.

In other words, in FH transmitter 30A, the DL signal for each frequency interval #j received from master station processor 20A is signal-processed in parallel in accordance with frequency interval #j, multiplexed with the FH control information including corresponding FH transmission scheme information #j, and transmitted to FH 13.

When an optical fiber cable is used for FH 13, for example, transmitter 304-*j* may be provided with an E/O converter (not shown). WDM may be applied in the E/O converter. In other words, in the second exemplary embodiment, a signal for each interval #j transmitted from master station device 11 to FH 13 may be multiplexed by any one of TDM, FDM, CDM, and WDM.

Multiplexing part 303-*j* may be omitted. For example, the physical channel signal and the FH control information in accordance with frequency interval #j may be physically separated and transmitted to secondary station device 12 without being multiplexed. When multiplexing part 303-*j* is omitted, separator 402-*j* (described later in FIG. 12) in FH receiver 40 of secondary station device 12 may also be omitted.

In FH transmitter 30A, FH transmission processor 302, multiplexing part 303, and transmitter 304 do not have to be provided in accordance with a plurality of (frequency) intervals #j. For example, one FH transmission processor 302, multiplexing part 303, and transmitter 304 may each perform signal processing of the plurality of frequency intervals #j in parallel.

Secondary Station Device 12

FH Receiver 40A

Figure 12:
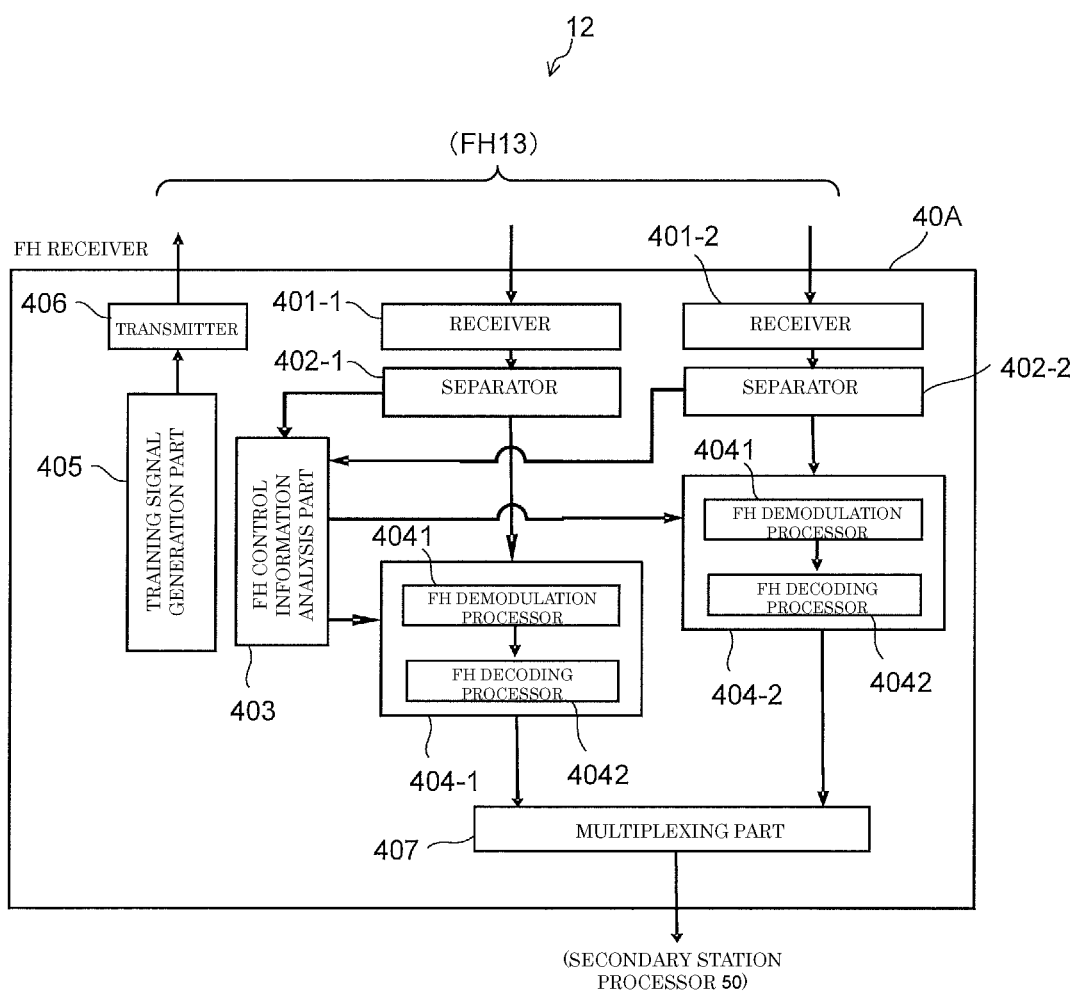
FIG. 12 is a diagram showing an example of a configuration of an FH receiver in a secondary station device according to the second exemplary embodiment.

FIG. 12 is a block diagram showing an example of a configuration of FH receiver 40A in secondary station device 12 according to the second exemplary embodiment.

In FH receiver 40A illustrated in FIG. 12, in the configuration illustrated in FIG. 4, each of receiver 401, separator 402, and FH reception processor 404 (FH demodulation processor 4041 and FH decoding processor 4042) may be provided in accordance with frequency interval #j. FH receiver 40A may include, for example, multiplexing part 407 that multiplexes each output signal of FH reception processor 404-*j*.

In FH receiver 40A, the FH control information (FH transmission scheme information #j) of frequency interval #j is separated and input to FH control information analysis part 403 in each separator 402-*j*. FH transmission scheme information #j is input from FH control information analysis part 403 to corresponding FH reception processor 404-*j* in accordance with frequency interval #j.

Therefore, the DL signal received from FH transmitter 30A in accordance with frequency interval #j in receiver 401-*j* is subjected to reception processing including demodulation and decoding in parallel in accordance with frequency interval #j in FH reception processor 404-*j* and output to multiplexing part 407.

For example, multiplexing part 407 multiplexes each output signal of FH reception processor 404-*j* and outputs the signal to secondary station processor 50. In the second exemplary embodiment, the configuration and operation of secondary station processor 50 may be the same as the configuration (FIG. 5) and the operation illustrated in the first exemplary embodiment.

In an operation example of radio base station 1 according to the second exemplary embodiment, in the description of the sequence diagram illustrated in FIG. 6, (time) interval #j may be described as frequency interval #j, and it may be understood that the operation corresponds to operation in which the signal is processed in accordance with frequency interval #j.

For example, scheduling (S607) is performed for frequency interval #j, and transmission of the FH control information (FH transmission scheme information #j) (S608, S609) and transmission of the DL signal (S610) are each performed in parallel in accordance with frequency interval #j.

As described above, according to the second exemplary embodiment, between UE (for example, low MCS terminal) 2 having high FH residual distortion resistance and UE (for example, high MCS terminal) 2 having low FH residual distortion resistance, different frequency intervals are assigned in the FH resource.

In other words, UE 2 with the same or proximate (or similar) FH residual distortion resistance is scheduled to one frequency interval #j in the FH transmission. Therefore, as in the first exemplary embodiment, since the FH transmission scheme applied can be optimized for each of the UE groups with the same or proximate FH residual distortion resistance in the FH transmission, FH transmission efficiency can be improved.

In the second exemplary embodiment, since scheduling is performed for frequency interval #j of the FH resource, the DL signals of the plurality of UE groups can be transmitted in parallel (for example, at the same timing). Therefore, for example, even if the DL signals addressed to the plurality of UEs 2 using the same service are assigned to different frequency intervals #j, it is possible to suppress that a transmission delay differs between the UE groups.

The scheduling to frequency interval #j may be performed, for example, based on information on a service type of the DL signal addressed to UE 2 subjected to FH transmission, in addition to the UE classification information.

In the second exemplary embodiment, the FH resource is split on the frequency axis, and therefore, for example, a functional part that processes a signal before IFFT can be applied to a functional split configuration included in both master station device 11 and secondary station device 12.

In FH receiver 40A, receiver 401, separator 402, and FH reception processor 404 (FH demodulation processor 4041 and FH decoding processor 4042) in the configuration illustrated in FIG. 4 do not have to be provided in accordance with a plurality of (frequency) intervals #j. For example, one receiver 401, separator 402, and FH reception processor 404 (FH demodulation processor 4041 and FH decoding processor 4042) may each perform signal processing of the plurality of frequency intervals #j in parallel.

In FIG. 12, multiplexing part 407 may be omitted. For example, each output of FH reception processor 404-$j$ may be input to secondary station processor 50 in parallel. In this case, secondary station processor 50 may be configured to perform physical channel processing on each of the signals input in parallel, or among the signals input in parallel, physical channel processing may be performed collectively on the signals mapped to the same physical channel.

Third Exemplary Embodiment

In the third exemplary embodiment, a UL configuration corresponding to the DL configuration described in the first exemplary embodiment will be described. The notation "interval #j" used in the explanation of the third exemplary embodiment (and the fourth exemplary embodiment described later) is a convenient notation for expressing that the FH resource is split into a plurality of intervals as described in the first exemplary embodiment (or the second exemplary embodiment), and does not mean that interval #j related to UL always matches interval #j related to the DL described above. Interval #j related to the UL may or may not be the same as interval #j of the DL. In other words, a number of split intervals may be set independently for the UL and the DL.

Figure 13:
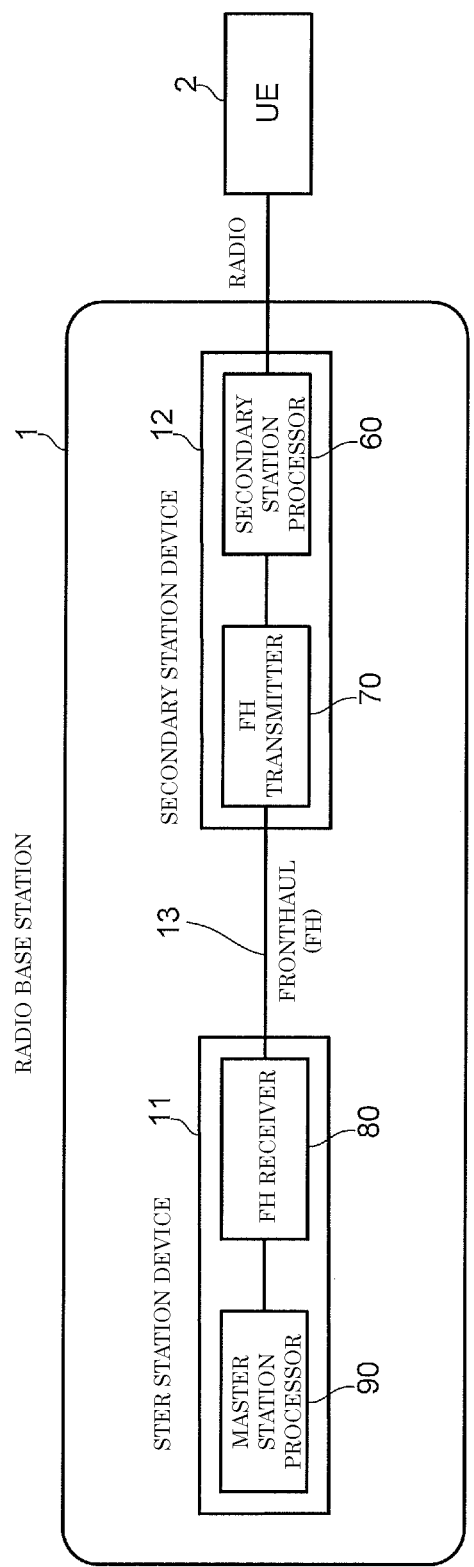
FIG. 13 is a diagram showing an example of a configuration of a radio communication system according to a third exemplary embodiment.

FIG. 13 is a diagram showing an example of a configuration of a radio communication system according to the third exemplary embodiment. As illustrated in FIG. 13, when focusing on UL communication from UE 2 to radio base station 1, radio base station 1 includes, for example, secondary station processor 60 and FH transmitter 70 in secondary station device 12, and includes, for example, FH receiver 80 and master station processor 90 in master station device 11.

Figure 14:
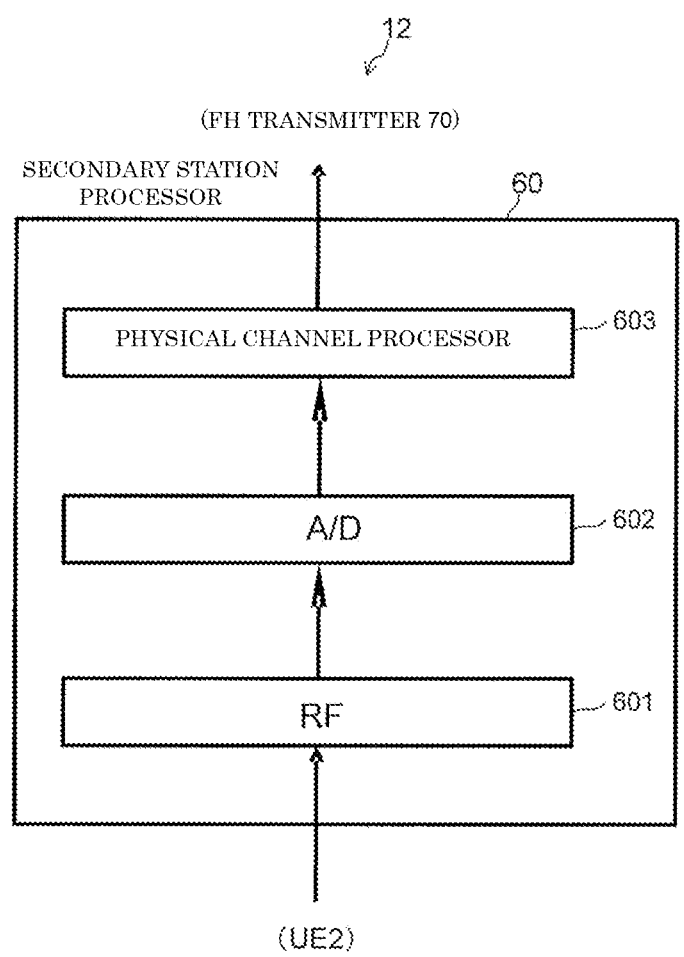
FIG. 14 is a diagram showing an example of a configuration of a secondary station processor in a secondary station device illustrated in FIG. 13.
Figure 15:
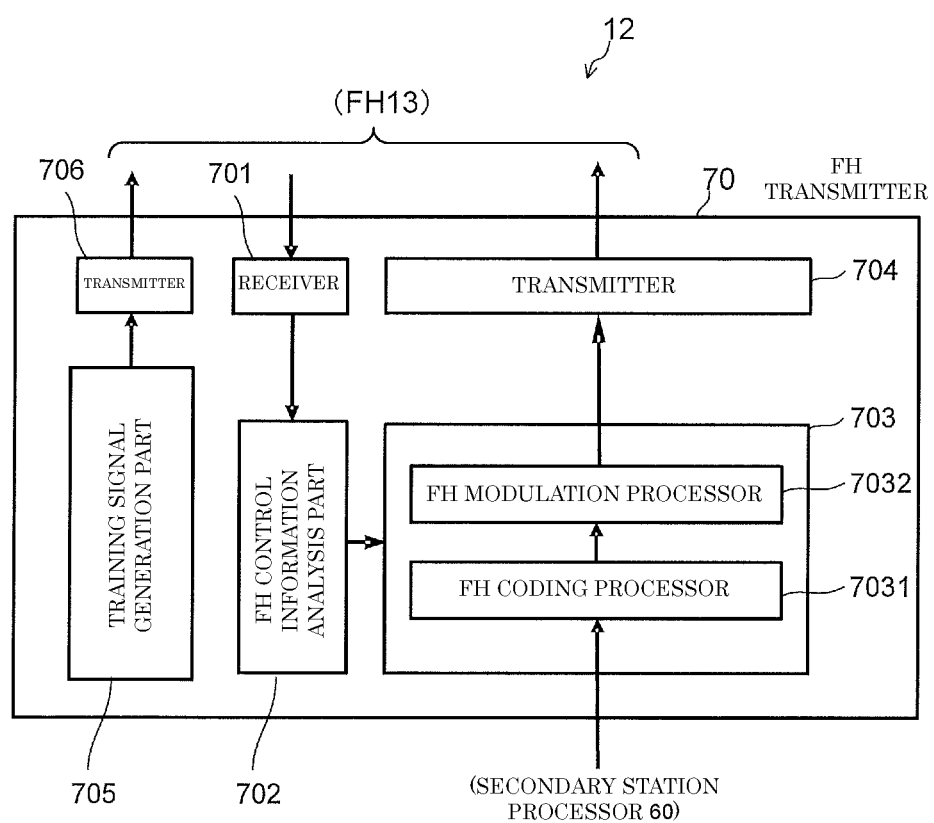
FIG. 15 is a diagram showing an example of a configuration of an FH transmitter in the secondary station device illustrated in FIG. 13.
Figure 16:
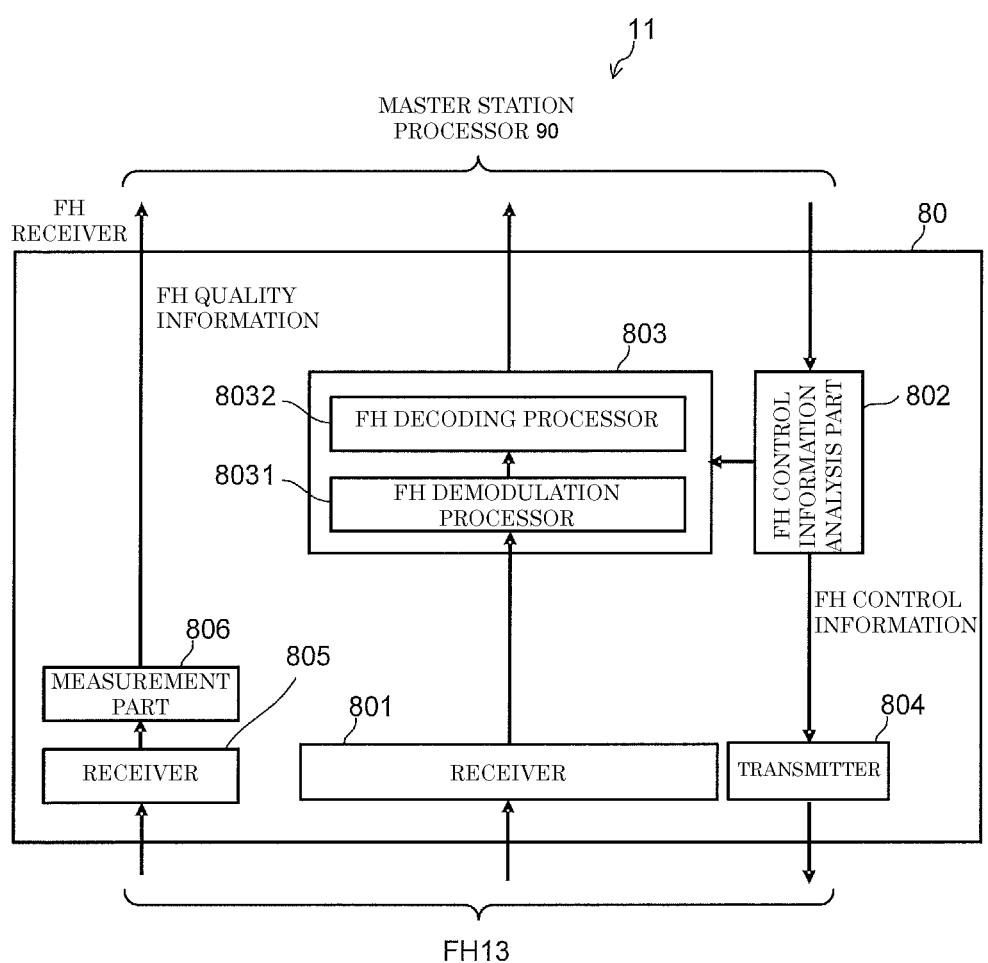
FIG. 16 is a diagram showing an example of a configuration of an FH receiver in a master station device illustrated in FIG. 13.
Figure 17:
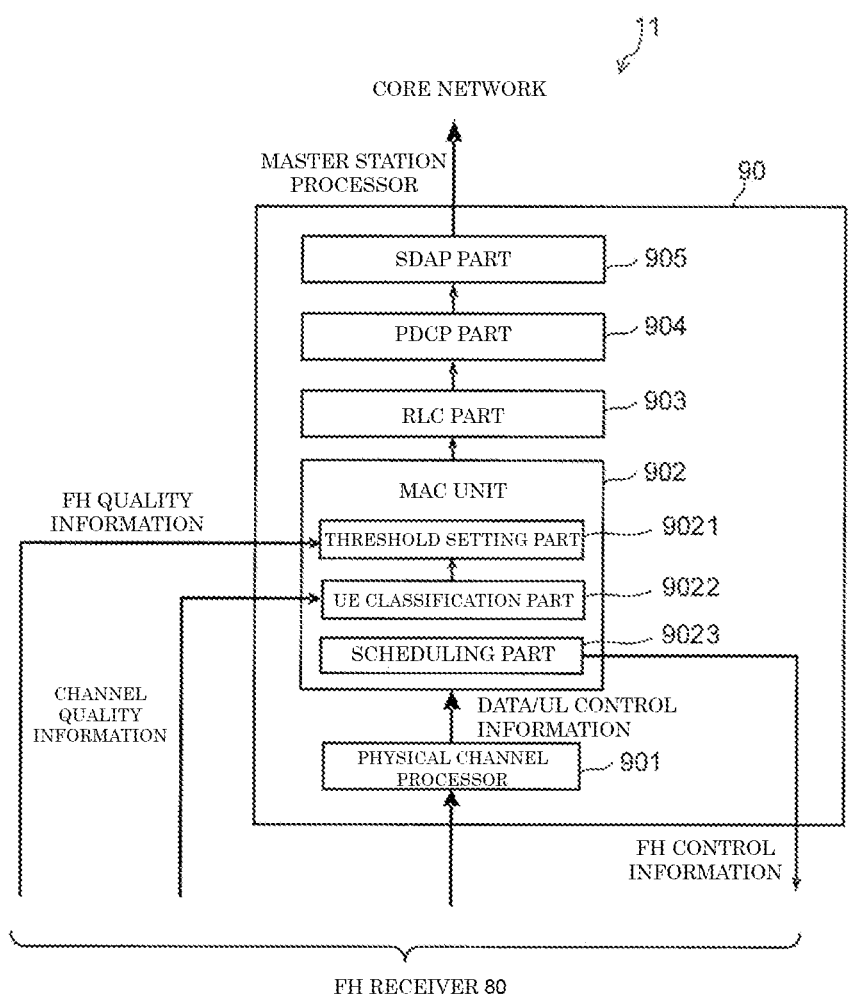
FIG. 17 is a diagram showing an example of a configuration of a master station processor in the master station device illustrated in FIG. 13.

FIGS. 14 and 15 show an example of a configuration of secondary station device 12 (secondary station processor 60 and FH transmitter 70) focusing on the UL. FIGS. 16 and 17 show an example of a configuration of master station device 11 (FH receiver 80 and master station processor 90) focusing on the UL.

Secondary Station Device 12

First, an example of the configuration of secondary station processor 60 and FH transmitter 70 in secondary station device 12 will be described with reference to FIGS. 14 and 15. As in the first exemplary embodiment, two or more secondary station devices 12 can be connected to one master station device 11, and one secondary station device 12 can be connected to two or more UEs 2.

Secondary Station Processor 60

As illustrated in FIG. 14, secondary station processor 60 includes, for example, RF part 601, A/D (analog to digital) converter 602, and physical channel processor 603.

For example, RF part 601 has an antenna, receives a radio signal of the UL transmitted from UE 2 by the antenna, and performs reception RF processing, such as down-conversion processing and low noise amplification processing, on the received radio signal.

A/D converter 602 converts, for example, an output (analog signal) of RF part 601 into a digital signal.

For example, physical channel processor 603 applies signal processing of the physical channel, such as CP removal (removal), FFT (first Fourier transform), and beamforming, to an output of A/D converter 602. When beamforming is not performed in secondary station device 12, the beamforming process may be omitted.

FH Transmitter 70

On the other hand, as illustrated in FIG. 15, FH transmitter 70 includes receiver 701, FH control information analysis part 702, FH transmission processor 703, transmitter 704, training signal generation part 705, and transmitter 706.

For example, receiver 701 receives the FH control information determined in master station processor 90 (for example, scheduling part 9023) described later in FIG. 17 and transmitted from FH receiver 80 described later in FIG. 16.

FH control information analysis part 702 outputs, for example, FH transmission scheme information #j, included in the FH control information received by receiver 701, to FH transmission processor 703.

For example, the FH control information from FH control information analysis part 702 and an output signal (UL signal) of secondary station processor 60 are input to FH transmission processor 703. FH transmission processor 703 includes, for example, FH coding processor 7031 and FH modulation processor 7032.

For example, FH coding processor 7031 encodes the physical channel signal of interval #j input from secondary station processor 60 and outputs the signal to FH modulation processor 7032, in accordance with the code type and the coding rate included in FH transmission scheme information #j from FH control information analysis part 702.

For example, FH modulation processor 7032 modulates an output signal corresponding to interval #j of FH coding processor 7031 to a multilevel modulation signal, such as QPSK, 16QAM, 64QAM, or 256QAM, in accordance with the modulation multilevel number included in FH transmission scheme information #j. The modulation signal is output to transmitter 704.

For example, transmitter 704 performs, on an output signal of FH transmission processor 703, transmission processing (for example, packet configuration processing or header addition processing) according to, for example, wired transmitting means (or wired interface) such as a UTP cable, an STP cable, or an optical fiber cable and performs transmission to FH 13.

For example, as in the first exemplary embodiment, training signal generation part 705 generates a training signal, which is an example of a known signal for measuring the transmission quality of FH 13, and outputs the signal to transmitter 706.

Transmitter 706 transmits, for example, the training signal to FH 13 connected to master station device 11. The training signal transmitted to FH 13 is received, for example, by receiver 805 (see FIG. 16) of FH receiver 80 in master station device 11.

The transmission quality of FH 13 may be measured, for example, by transmitting the training signal in an opposite direction (in other words, DL direction) as supplemented in the first exemplary embodiment. For example, the training signal transmitted from FH receiver 80 of master station device 11 to FH transmitter 70 of secondary station device 12 may be received and measured in FH transmitter 70, and the measurement result may be fed back to FH receiver 80.

One or both of training signal generation part 705 and transmitter 706 may not be provided inside FH transmitter 70, and may be provided inside secondary station device 12.

FH control information analysis part 702 may be made common to FH control information analysis part 403 illustrated in FIG. 4. Training signal generation part 705 may be made common to training signal generation part 405 illustrated in FIG. 4. Transmitter 706 may be made common to transmitter 406 illustrated in FIG. 4.

Master Station Device 11

Next, an example of the configurations of FH receiver 80 and master station processor 90 in master station device 11 will be described with reference to FIGS. 16 and 17.

FH Receiver 80

As illustrated in FIG. 16, FH receiver 80 includes, for example, receiver 801, FH control information analysis part 802, FH reception processor 803, transmitter 804, receiver 805, and measurement part 806.

Receiver 801 receives, for example, a signal (including the UL signal transmitted by UE 2) transmitted from FH transmitter 70 of secondary station device 12 to FH 13.

For example, FH control information analysis part 802 receives the FH control information (FH transmission scheme information #j for each interval #j) determined in master station processor 90 (for example, scheduling part 9023), and outputs FH transmission scheme information #j to FH reception processor 803 and transmitter 804.

Transmitter 804 transmits, for example, the FH control information including FH transmission scheme information #j to FH transmitter 70 of secondary station device 12. This FH control information is received by receiver 701 of FH transmitter 70.

FH reception processor 803 includes, for example, FH demodulation processor 8031 and FH decoding processor 8032.

FH demodulation processor 8031 applies demodulation processing, corresponding to modulation processing applied to interval #j in FH transmitter 70, to an output signal (physical channel signal of UL) of receiver 801, for example, based on FH transmission scheme information #j input from FH control information analysis part 802. The signal demodulated by this demodulation processing is output to FH decoding processor 8032.

FH decoding processor 8032 applies the decoding processing, corresponding to the coding processing applied to interval #j in FH transmitter 70, to the output signal of FH demodulation processor 8031, for example, based on FH transmission scheme information #j. The physical channel signal is decoded by this decoding processing and transmitted to master station processor 90.

Receiver 805 receives the training signal transmitted by FH transmitter 70 (for example, transmitter 706) of secondary station device 12, and outputs the training signal to measurement part 806.

Measurement part 806 measures, for example, a reception quality (in other words, transmission quality of FH 13) of the training signal input from receiver 805, and outputs the quality measurement result as, for example, the FH quality information to master station processor 90 (for example, threshold setting part 9021 in MAC unit 902 of FIG. 17). The FH quality information may be transmitted to master station processor 90 through FH 13, or may be transmitted to master station processor 90 through a communication path different from FH 13.

Although not shown in FIGS. 14 to 17, the channel quality information transmitted to the UL by UE 2 is output (or transmitted) to master station processor 90 (for example, UE classification part 9022 in MAC unit 902 of FIG. 17) via secondary station processor 60, FH transmitter 70, and FH receiver 80.

One or both of receiver 805 and measurement part 806 may be provided in master station device 11, and may be provided in a functional block different from FH receiver 80 in master station device 11.

Receiver 805 may be made common to receiver 305 illustrated in FIG. 3, and measurement part 806 may be made common to measurement part 306 illustrated in FIG. 3. FH control information analysis part 802 may be made common to FH control information analysis part 301 illustrated in FIG. 3.

Master Station Processor 90

On the other hand, master station processor 90 includes physical channel processor 901, MAC unit 902, RLC part 903, PDCP part 904, and SDAP part 905, as illustrated in FIG. 17.

The physical channel signal of the UL demodulated and coded in FH receiver 80 is input to physical channel processor 901. For example, physical channel processor 901 may apply signal processing, such as RE demapping, layer demapping, demodulation, descrambling, and decoding, to the input physical channel signal.

For example, user data of the UL is demapped from a resource of PUSCH (physical uplink shared channel), which is an example of a physical data channel of the UL. UL control information (sometimes referred to as "UE control information" or "radio control information") is demapped from, for example, a resource of PUCCH (physical uplink control channel), which is an example of a physical control channel of the UL.

For example, MAC unit 902 generates an RLC PDU from an MAC PDU of the UL signal and outputs the RLC PDU to RLC part 903. For example, MAC unit 902 determines UE 2 to which a communication opportunity of the UL is assigned by scheduling and determines an MCS in radio transmission of the UL. In the determination of the MCS, channel quality information (for example, CQI) fed back from UE 2 may be used.

MAC unit 902 may include, for example, threshold setting part 9021, UE classification part 9022, and scheduling part 9023.

It may be understood that threshold setting part 9021, UE classification part 9022, and scheduling part 9023 have a functional part equivalent to threshold setting part 2041, UE classification part 2042, and scheduling part 2043 described in FIG. 2, respectively.

Alternatively, threshold setting part 9021, UE classification part 9022, and scheduling part 9023 may be made common to threshold setting part 2041, UE classification part 2042, and scheduling part 2043, respectively.

Threshold setting part 9021 determines a threshold value (or threshold range) for switching the FH transmission scheme, for example, based on the FH quality information measured by measurement part 806 of FH receiver 80, and outputs information (threshold information) indicating the determined threshold value (or threshold range) to UE classification part 9022.

As in the first exemplary embodiment, the threshold value (or threshold range) may be determined, for example, to a value (or range) in which the higher the quality exhibited by the FH quality information, the higher the number of UEs 2 to which the high MCS is applied (in which FH residual distortion resistance is low).

Conversely, as the FH quality information exhibits a lower quality, the threshold value (or threshold range) may be determined, for example, to a value (or threshold range) in which the number of UEs 2 to which low MCS is applied (in which the FH residual distortion resistance is high) increases.

The threshold information determined by threshold setting part 9021 and the CQI fed back from UE 2 by a UL signal may be input to UE classification part 9022. UE classification part 9022 classifies UE 2 into a UE group to which the high MCS is applied (in which the FH residual distortion resistance is low) for the UL signal and a UE group to which the low MCS is applied (in which the FH residual distortion resistance is high) for the UL signal, for example, based on the threshold information and the CQI. Information on the UE group (UE classification information) is output to scheduling part 9023 together with the CQI of each UE 2, for example. The number of UEs 2 constituting the UE group may be "1".

Scheduling part 9023 determines UE 2 that allocates the communication opportunity of UL from UE 2 in the classified UE group, for example, based on the UE classification information from UE classification part 9022. For example, in scheduling part 9023, UE 2 to which the communication opportunity of the UL is assigned generates the RLC PDU from the UL signal of a transmission source and outputs the RLC PDU to RLC part 903.

For example, scheduling part 9023 transmits the FH control information, including FH transmission scheme information #j for each interval #j, to FH transmitter 70 of secondary station device 12 via, for example, FH receiver 80. For example, the FH control information (FH transmission scheme information #j) is used to determine the FH transmission scheme when secondary station device 12 transmits the UL signal of the UE group to which the communication opportunity of the UL is assigned from FH transmitter 70 to FH 13.

For example, RLC part 903 performs processing, such as error detection and retransmission control by ARQ, on the output of MAC unit 902, and outputs a PDCP PDU.

PDCP part 904 performs processing, such as decoding of encrypted user data and header decompression, on the output of RLC part 903, and outputs an SDAP PDU to SDAP part 905.

For example, SDAP part 905 maps a QoS flow and a radio bearer, removes an SDAP header from the output of PDCP part 904, and transmits the output to a higher-level core network.

In an operation example focusing on the UL according to the third exemplary embodiment, for example, in the sequence diagram illustrated in FIG. 6 of the first exemplary embodiment, the flow of the "physical channel signal" is in the opposite direction, and it may be understood that master station processor 20, FH transmitter 30, FH receiver 40, and secondary station processor 50 correspond to operation described as master station processor 90, FH receiver 80, FH transmitter 70, and secondary station processor 60, respectively.

For example, in the sequence diagram of FIG. 6, a target of the threshold setting based on the FH quality information (S604), the UE classification based on the threshold value and the channel quality information (S606), and the determination of UE 2 giving the communication opportunity (S607) is described as the UL signal.

As described above, according to the third exemplary embodiment, as in the first exemplary embodiment, with respect to the UL, UE 2 with the same or proximate (or similar) FH residual distortion resistance can be scheduled to one time interval #j in the FH transmission.

Therefore, since the FH transmission scheme applied for the UL can be optimized for each of the UE groups with the same or proximate FH residual distortion resistance in the FH transmission related to the UL, FH transmission efficiency of the UL can be improved.

Also in the third exemplary embodiment, as in the first exemplary embodiment, the scheduling to interval #j may be performed, for example, based on information on a service type of the DL signal addressed to UE 2 subjected to FH transmission, in addition to the UE classification information.

Fourth Exemplary Embodiment

Radio base station 1 according to the fourth exemplary embodiment has a UL configuration corresponding to the DL configuration (FIGS. 10 to 12) described in the second exemplary embodiment. In other words, the fourth exemplary embodiment corresponds to an example in which the FH transmission scheme of the UL is controlled in accordance with frequency interval #j in the UL configuration illustrated in the third exemplary embodiment, as in the second exemplary embodiment.

For example, in the fourth exemplary embodiment, secondary station device 12 may be provided with secondary station processor 60 illustrated in FIG. 14 and the FH transmitter including, for example, FH transmission processor 703 (FH coding processor 7031 and FH modulation processor 7032) in accordance with frequency interval #j in the FH transmitter configuration illustrated in FIG. 15.

In the fourth exemplary embodiment, master station device 11 may be provided with the FH receiver including, for example, FH reception processor 803 (FH demodulation processor 8031 and FH decoding processor 8032) in accordance with frequency interval #j in the FH receiver configuration illustrated in FIG. 16.

As the master station processor included in master station device 11 in the fourth exemplary embodiment, in the master station processor configuration illustrated in FIG. 17, for example, a master station processor including physical channel processor 901 in accordance with frequency interval #j may be provided.

With the above configuration, regarding the UL signal transmitted from secondary station device 12 to master station device 11 through FH 13, the FH transmission scheme can be controlled in accordance with frequency interval #j (in other words, in accordance with UE group #j classified according to a difference in the FH residual distortion resistance).

Therefore, for each frequency interval #j, in other words, for each of the UE groups with the same or proximate FH residual distortion resistance in the FH transmission, the FH transmission scheme applied for the UL can be optimized, and the FH transmission efficiency of the UL can be improved.

In the fourth exemplary embodiment, as in the second exemplary embodiment, since scheduling is performed for frequency interval #j of the FH resource, the UL signals of the plurality of UE groups can be received in parallel (for example, at the same timing). Therefore, for example, even if the UL signals transmitted from the plurality of UEs 2 using the same service are assigned to different frequency intervals #j, it is possible to suppress that a transmission delay of UL differs between the UE groups.

As in the second exemplary embodiment, the scheduling to frequency interval #j may be performed, for example, based on information on a service type of the UL signal subjected to FH transmission, in addition to the UE classification information.

Others

The first exemplary embodiment and the second exemplary embodiment may be implemented in combination. Similarly, the third exemplary embodiment and the fourth exemplary embodiment may be implemented in combination. For example, the UE group may be assigned in units of split FH resources on both the time axis and the frequency axis.

The first exemplary embodiment and the second exemplary embodiment may be switched and (selectively) implemented. Similarly, the third exemplary embodiment and the fourth exemplary embodiment may be switched and (selectively) implemented.

The first exemplary embodiment regarding the DL and the fourth exemplary embodiment regarding the UL may be implemented in combination, or the second exemplary embodiment regarding the DL and the third exemplary embodiment regarding the UL may be implemented in combination. In other words, for the split of the FH resource, the DL and the UL may differ in whether time interval #j or frequency interval #j is used.

In the first to fourth exemplary embodiments described above, the channel quality information (for example, CQI) used for the classification of UE 2 (in other words, determination of threshold value) may be described as information or a parameter indicating a radio propagation environment (or propagation condition) between UE 2 and radio base station 1. For example, since the radio propagation environment may differ depending on factors such as a distance between UE 2 and radio base station 1 and the presence or absence of a shield, an index related to such factors may be used for the classification of UE 2.

In the first to fourth exemplary embodiments described above, at least one of master station processor 20 (or 90) and secondary station processor 50 (or 60) may be composed of a logical slice. At least one of master station device 11 and secondary station device 12 may be composed of a logical slice.

The FH transmission quality may be measured using, for example, a CRC result of DL or UL data, or acknowledgment (Ack/Nack) information based on the CRC result, instead of the training signal. In this case, the transmission and reception of signals for FH transmission quality measurement can be eliminated. Therefore, utilization efficiency of the FH band can be improved.

FH transmitter 30 of the DL and FH receiver 80 of the UL may be configured as physically different devices, or may be implemented in the physically same device. Furthermore, FH transmitter 30 and FH receiver 80 may be integrated as, for example, an FH transmission/reception device or an FH communication device shared by the DL and the UL.

Also in secondary station device 12, similarly, FH receiver 40 of the DL and FH transmitter 70 of the UL may be configured as physically different devices, or may be implemented in the physically same device. Furthermore, FH receiver 40 and FH transmitter 70 may be integrated as, for example, an FH transmission/reception device or an FH communication device shared by the DL and the UL.

Secondary station processor 50 of the DL and secondary station processor 60 of the UL may be configured as physically different devices, or may be implemented in the physically same device.

When the notation " . . . part/unit" used in the first to fourth exemplary embodiments described above means a physical element, this notation may be replaced with another notation such as " . . . circuitry", " . . . device", " . . . unit", or " . . . module". On the other hand, when the notation " . . . part/unit" means a logical element, this notation may be replaced with "slice" as described above, for example.

The term "functional split point" used in the first to fourth exemplary embodiments described above may be referred to as "split", "option", or "split option".

For example, in Common Public Radio Interface: eCPRI Interface Specification V2.0 (2019 May 10), splits A to E are specified. As an example of "split option", for example, as described in ITU-T G-series Recommendations—Supplement 66 (2018-10), the following split options 1 to 8 can be mentioned.

(1) Split option 1: Between RRC (radio resource control) and PDCP
(2) Split option 2: Between PDCP and RLC (High-RLC)
(3) Split option 3: Between High-RLC and Low-RLC
(4) Split option 4: Between RLC (Low-RLC) and MAC (High-MAC)
(5) Split option 5: Between High-MAC and Low-MAC
(6) Split option 6: Between MAC (Low-MAC) and PHY (High-PHY)
(7) Split option 7: Between High-PHY and Low-PHY
(8) Split option 8: Between PHY (Low-PHY) and RF With respect to the first and third exemplary embodiments in which the FH resource is split on the time axis, it may be understood that, for example, any of the split options 1 to 8 is applicable. With respect to the second and fourth exemplary embodiments in which the FH resource is split on the frequency axis, it may be understood that, for example, any of the split options 1 to 7 is applicable.

As shown in the above split options 1 to 8, in the first to fourth exemplary embodiments, the RLC part and the MAC unit may be functionally split (or classified) into a higher-level (High) part and a lower-level (Low) part, respectively.

Any one of splits A to E (or split options 1 to 8) may be further split (or classified) as, for example, a "sub-split" (or "sub-option").

In the first to fourth exemplary embodiments, the case where the number of the functional split points is one (functional split configuration includes master station device 11 and secondary station device 12) has been described. However, the number of the functional split points may be two or more. For example, a plurality of base station functional parts may be divided and disposed in three units, including CU, DU, and RU (radio unit), by the two functional split points.

In this case, for example, connection between the CU and the DU corresponds to FH 13. For example, a threshold value (or threshold range) that classifies UE 2 may be determined based on the transmission quality information between the CU and the DU, and grouping of UE 2 and allocation of the UE group to interval #j may be performed.

The present disclosure can be achieved by software, hardware, or software linked with hardware. Each functional block used in the description of the above exemplary embodiments is achieved as a large scale integration (LSI) which is an integrated circuit partially or entirely, and each process described in the above exemplary embodiments may be controlled by one LSI or a combination of LSIs partially or entirely. The LSI may be composed of individual chips, or may be composed of a single chip so as to include some or all of the functional blocks. The LSI may include an input and an output for data. Depending on a difference in a degree of integration, the LSI may be referred to as an integrated circuit (IC), a system LSI, a super LSI, or an ultra LSI.

The technique of implementing an integrated circuit is not limited to the LSI and may be achieved by using a dedicated circuit, a general-purpose processor, or a dedicated processor. In addition, a field programmable gate array (FPGA) that can be programmed after the manufacture of an LSI or a reconfigurable processor in which the connections and settings of circuit cells disposed inside an LSI can be reconfigured may be used. The present disclosure may be achieved as digital processing or analog processing.

If future integrated circuit technology replaces LSI as a result of the advancement of semiconductor technology or other derivative technology, the functional blocks could be integrated using the future integrated circuit technology. For example, biotechnology can also be applied.

Summary of Present Disclosure

A master station device according to one non-limiting embodiment of the present disclosure includes a controller that determines, based on transmission quality information of a fronthaul and channel quality information of at least one terminal, a resource and a transmission scheme of the fronthaul assigned to the at least one terminal, and a transmitter that controls, based on information determined by the controller, the transmission scheme of a signal to be transmitted to the fronthaul using the resource.

In the master station device according to one non-limiting embodiment of the present disclosure, the at least one terminal may include a plurality of terminals, the plurality of terminals may be classified into terminal groups based on the channel quality information, and the controller may determine the resource and the transmission scheme of the fronthaul for each of the terminal groups.

In the master station device according to one non-limiting embodiment of the present disclosure, the at least one terminal may include a first terminal and a second terminal, the channel quality information of the first terminal being less than a threshold value, the channel quality information of the second terminal being greater than the threshold value, and the controller may allocate a first transmission scheme as the transmission scheme of the fronthaul to the first terminal, and may allocate a second transmission scheme as the transmission scheme of the fronthaul to the second terminal, the second transmission scheme having a higher error tolerance than an error tolerance of the first transmission scheme.

In the master station device according to one non-limiting embodiment of the present disclosure, the controller may allocate the first terminal to a first resource of the fronthaul and allocate the second terminal to a second resource of the fronthaul.

In the master station device according to one non-limiting embodiment of the present disclosure, the threshold value may be based on the transmission quality information of the fronthaul.

In the master station device according to one non-limiting embodiment of the present disclosure, each of the first resource and the second resource may be one of resources of the fronthaul divided at at least one of a time axis and a frequency axis.

The master station device according to one non-limiting embodiment of the present disclosure may include a receiver that controls, based on information determined by the controller, the transmission scheme of a signal received from the fronthaul using the resource.

A base station according to one non-limiting embodiment of the present disclosure includes a transmitter that transmits a signal to a fronthaul, a receiver that receives the signal from the fronthaul, a radio communication portion that radio-transmits the signal received by the receiver to at least one terminal, and a controller that controls, based on transmission quality information of the fronthaul and channel quality information of the terminal, a resource of the fronthaul to which the signal is assigned and a transmission scheme applied to the signal by the transmitter and the receiver.

In the base station according to one non-limiting embodiment of the present disclosure, the at least one terminal may include a plurality of terminals, the plurality of terminals may be classified into terminal groups based on the channel quality information, and the controller may determine the resource and the transmission scheme of the fronthaul for each of the terminal groups.

In the base station according to one non-limiting embodiment of the present disclosure, the at least one terminal may include a first terminal and a second terminal, the channel quality information of the first terminal being less than a threshold value, the channel quality information of the second terminal being greater than the threshold value, and the controller may allocate a first transmission scheme to the first terminal, and may allocate a second transmission scheme to the second terminal, the second transmission scheme having a higher error tolerance than an error tolerance of the first transmission scheme.

In the base station according to one non-limiting embodiment of the present disclosure, the controller may allocate the first terminal to a first resource of the fronthaul and allocate the second terminal to a second resource of the fronthaul.

In the base station according to one non-limiting embodiment of the present disclosure, the threshold value may be based on the transmission quality information of the fronthaul.

In the base station according to one non-limiting embodiment of the present disclosure, each of the first resource and the second resource may be one of resources of the fronthaul divided at at least one of a time axis and a frequency axis.

A communication control method which is performed by a base station, and which is according to one non-limiting embodiment of the present disclosure includes determining, based on transmission quality information of a fronthaul and channel quality information of a terminal, a resource and a transmission scheme of the fronthaul assigned to the terminal, and controlling, based on determined information, the transmission scheme of a signal to be transmitted to the fronthaul using the resource.

The present disclosure is suitable for, for example, a base station for radio communication.

What is claimed is:

1. A master station device comprising:
a controller which, in operation, determines, based on transmission quality information of a fronthaul and channel quality information of at least one terminal, a resource and a transmission scheme of the fronthaul assigned to the at least one terminal; and
a transmitter which, in operation, controls, based on information determined by the controller, the transmission scheme of a signal to be transmitted to the fronthaul using the resource,
wherein the at least one terminal includes a first terminal and a second terminal, the channel quality information of the first terminal being less than a threshold value, the channel quality information of the second terminal being greater than the threshold value, and
wherein the controller allocates a first transmission scheme as the transmission scheme of the fronthaul to the first terminal, and allocates a second transmission scheme as the transmission scheme of the fronthaul to the second terminal, the second transmission scheme having a higher error tolerance than an error tolerance of the first transmission scheme.

2. The master station device according to claim 1,
wherein the at least one terminal includes a plurality of terminals,
the plurality of terminals are classified into terminal groups based on the channel quality information, and
the controller determines the resource and the transmission scheme of the fronthaul for each of the terminal groups.

3. The master station device according to claim 1, wherein the controller allocates the first terminal to a first resource of the fronthaul and allocates the second terminal to a second resource of the fronthaul.

4. The master station device according to claim 1, wherein the threshold value is based on the transmission quality information of the fronthaul.

5. The master station device according to claim 3, wherein each of the first resource and the second resource is one of resources of the fronthaul divided at at least one of a time axis and a frequency axis.

6. The master station device according to claim 1, further comprising a receiver that controls, based on information determined by the controller, the transmission scheme of a signal received from the fronthaul using the resource.

7. A base station comprising:
a transmitter which, in operation, transmits a signal to a fronthaul;
a receiver which, in operation, receives the signal from the fronthaul;
a radio communication portion which, in operation, radio-transmits the signal received by the receiver to at least one terminal; and
a controller which, in operation, controls, based on transmission quality information of the fronthaul and channel quality information of the at least one terminal, a resource of the fronthaul to which the signal is assigned and a transmission scheme applied to the signal by the transmitter and the receiver,
wherein the at least one terminal includes a first terminal and a second terminal, the channel quality information of the first terminal being less than a threshold value, the channel quality information of the second terminal being greater than the threshold value, and
wherein the controller allocates a first transmission scheme to the first terminal, and allocates a second transmission scheme to the second terminal, the second transmission scheme having a higher error tolerance than an error tolerance of the first transmission scheme.

8. The base station according to claim 7,
wherein the at least one terminal includes a plurality of terminals,
the plurality of terminals are classified into terminal groups based on the channel quality information, and
the controller determines the resource and the transmission scheme of the fronthaul for each of the terminal groups.

9. The base station according to claim 7, wherein the controller allocates the first terminal to a first resource of the fronthaul and allocates the second terminal to a second resource of the fronthaul.

10. The base station according to claim 7, wherein the threshold value is based on the transmission quality information of the fronthaul.

11. The base station according to claim 9, wherein each of the first resource and the second resource is one of resources of the fronthaul divided at at least one of a time axis and a frequency axis.

12. A communication control method performed by a base station, the communication control method comprising:
determining, based on transmission quality information of a fronthaul and channel quality information of at least one terminal, a resource and a transmission scheme of the fronthaul assigned to the at least one terminal; and
controlling, based on information determined by the determining, the transmission scheme of a signal to be transmitted to the fronthaul using the resource,
wherein the at least one terminal includes a first terminal and a second terminal, the channel quality information of the first terminal being less than a threshold value, the channel quality information of the second terminal being greater than the threshold value, and
wherein the controlling includes allocating a first transmission scheme as the transmission scheme of the fronthaul to the first terminal, and allocating a second transmission scheme as the transmission scheme of the fronthaul to the second terminal, the second transmission scheme having a higher error tolerance than an error tolerance of the first transmission scheme.

* * * * *